US010755150B2

(12) United States Patent
Mori

(10) Patent No.: US 10,755,150 B2
(45) Date of Patent: Aug. 25, 2020

(54) IMAGE PROCESSING APPARATUS THAT PERFORMS PIXEL SYNTHESIS PROCESSING AND IMAGE PROCESSING METHOD

(71) Applicant: CANON KABUSHIKI KAISHA, Tokyo (JP)

(72) Inventor: Hiroshi Mori, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 269 days.

(21) Appl. No.: 15/671,290

(22) Filed: Aug. 8, 2017

(65) Prior Publication Data
US 2018/0053074 A1 Feb. 22, 2018

(30) Foreign Application Priority Data

Aug. 22, 2016 (JP) ................................. 2016-161925

(51) Int. Cl.
G06T 1/20 (2006.01)
G06K 15/02 (2006.01)
G06T 3/40 (2006.01)

(52) U.S. Cl.
CPC ......... G06K 15/02 (2013.01); G06K 15/1857 (2013.01); G06K 15/1889 (2013.01);
(Continued)

(58) Field of Classification Search
CPC ........... G06K 15/1857; G06K 15/1859; G06K 15/1889; G06K 15/189; G06K 15/1892;
(Continued)

(56) References Cited

U.S. PATENT DOCUMENTS 8,253,977 B2 * 8/2012 Mori ...................... G06K 15/02
358/1.18
2003/0095272 A1 * 5/2003 Nomizu ................ H04N 1/407
358/1.9
(Continued)

FOREIGN PATENT DOCUMENTS

JP H11164131 A 6/1999
JP 2003280626 A 10/2003
(Continued)

OTHER PUBLICATIONS

Office Action issued in Japanese Appln. No. 2016-161925 dated May 19, 2020.

Primary Examiner — Dwayne D Bost
Assistant Examiner — Stephen M Brinich
(74) Attorney, Agent, or Firm — Rossi, Kimms & McDowell LLP

(57) ABSTRACT

An image processing apparatus capable of performing pixel synthesis processing at high speed. Synthesis processing of a first object and a second object is performed for an area where the first object and the second object overlap each other. A first image formation processor stores first pixel data, which corresponds to the area, of pixel data of the first object, in a first communication memory and stores second pixel data, which corresponds to the area, of pixel data of the second object, in a second communication memory. A second image formation processor acquires the first and second pixel data from the first and second communication memories, respectively, and performs synthesis processing of the acquired first and second pixel data.

11 Claims, 31 Drawing Sheets

(52) U.S. Cl.
CPC .............. *G06T 1/20* (2013.01); *G06T 3/4038*
(2013.01); *H04N 2201/0094* (2013.01); *H04N*
*2201/0414* (2013.01); *H04N 2201/0416*
(2013.01)

(58) Field of Classification Search
CPC ........... G06T 1/20; G06T 1/60; G06T 3/4038;
H04N 2201/0094; H04N 2201/0414;
H04N 2201/0416; H04N 2201/04
USPC ....... 382/296, 276, 282–284, 164, 171, 173,
382/180
See application file for complete search history.

(56) References Cited

U.S. PATENT DOCUMENTS

| | | | | |
|---|---|---|---|---|
| 2004/0257623 | A1* | 12/2004 | Suzuki | H04N 1/405 |
| | | | | 358/3.03 |
| 2010/0086216 | A1* | 4/2010 | Lee | G06K 9/36 |
| | | | | 382/199 |

FOREIGN PATENT DOCUMENTS

| | | | |
|---|---|---|---|
| JP | 2009278468 A | 11/2009 | |
| JP | 2012058514 A | 3/2012 | |

* cited by examiner

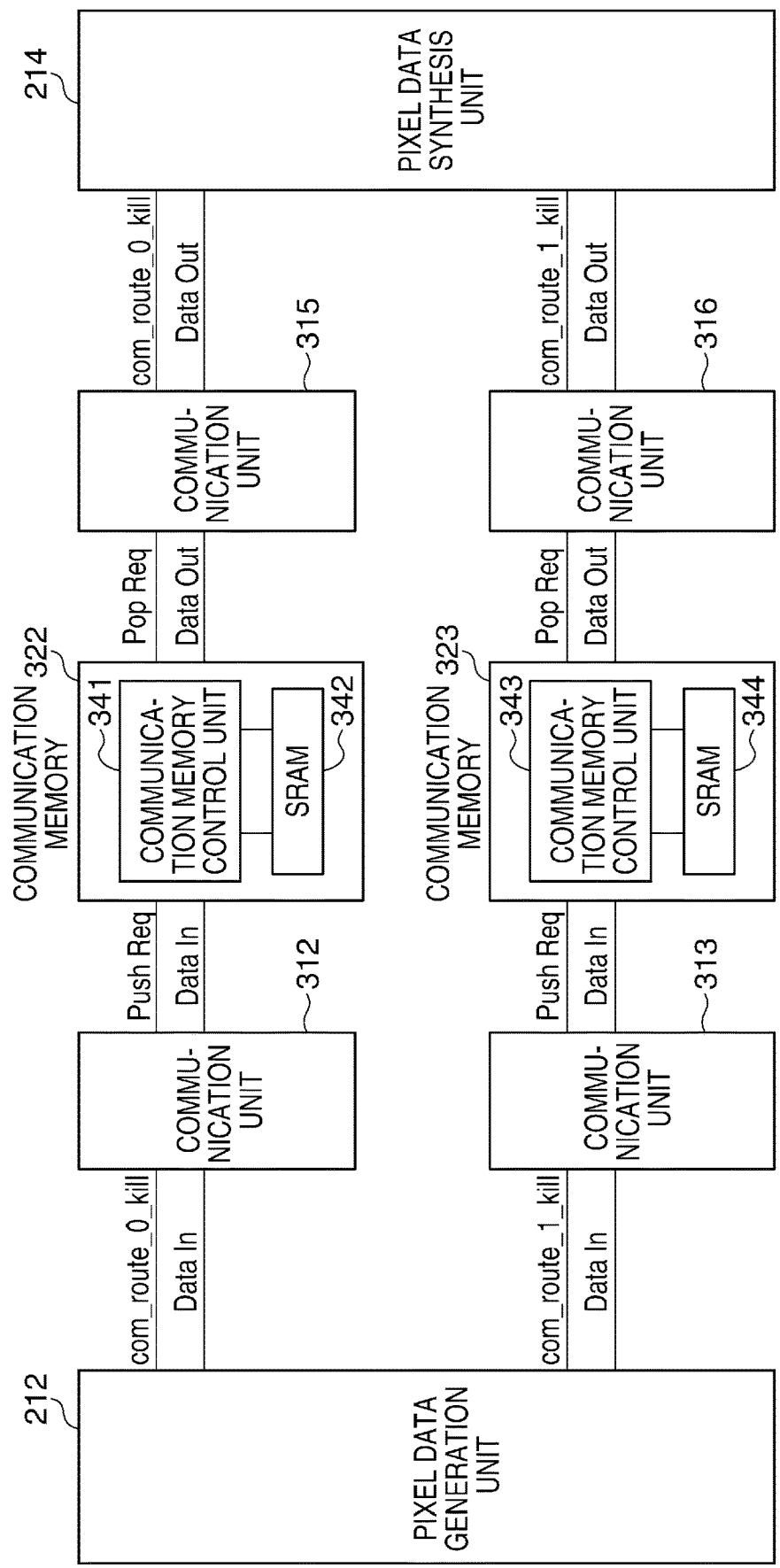

FIG. 5A

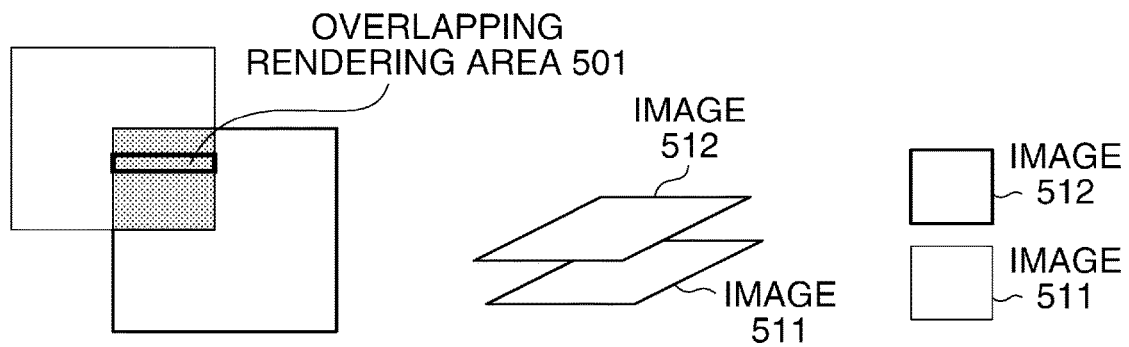

ROP2/ALPHA PROCESSING
(TWO OVERLAPPING IMAGES)

OVERLAPPING RENDERING AREA 501

IMAGE 512

IMAGE 511

IMAGE 512

IMAGE 511

FIG. 5B

CONTROL INFORMATION AND OBJECT INFORMATION
SENT VIA COMMUNICATION MEMORY 321

| OVERLAPPING RENDERING AREA | PIXEL LENGTH: 750 pix NUMBER OF OBJECTS: 2 | FILL TYPE: Image SYNTHESIS: ROP2 (DST) IMAGE INFORMATION | FILL TYPE: Image SYNTHESIS: ROP2 (SRC) IMAGE INFORMATION |
|---|---|---|---|
| 501 | CLOSED AREA CONTROL INFORMATION | OBJECT INFORMATION 522 (IMAGE 511) | OBJECT INFORMATION 523 (IMAGE 512) |

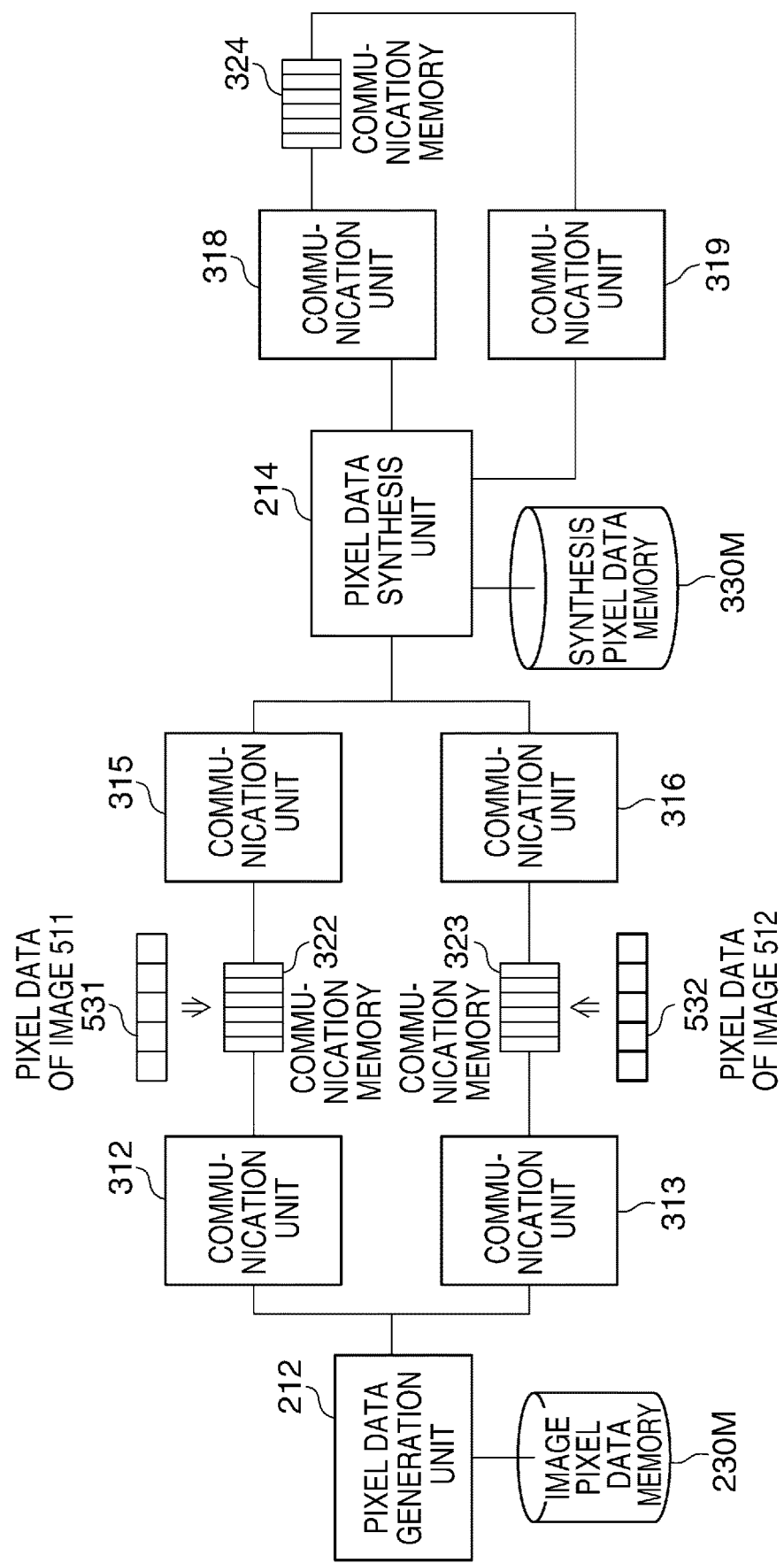

FIG. 6A

ROP2/ALPHA PROCESSING
(THREE OR MORE OVERLAPPING IMAGES)

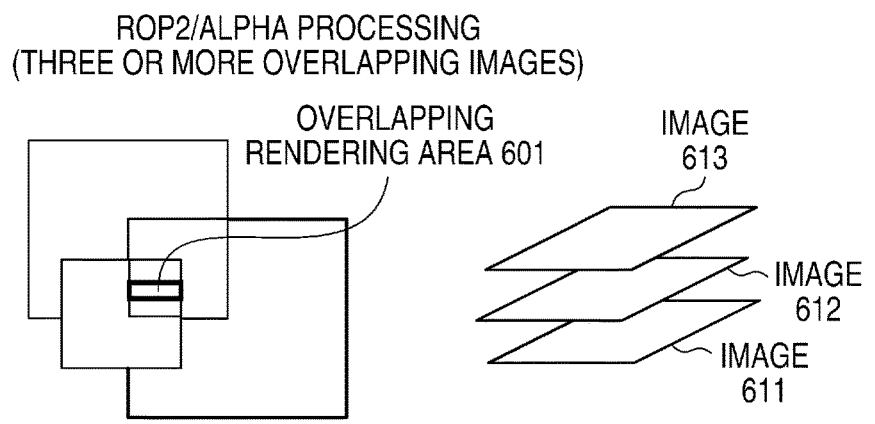

FIG. 6B

CONTROL INFORMATION AND OBJECT INFORMATION
SENT VIA COMMUNICATION MEMORY 321

| OVERLAPPING RENDERING AREA | PIXEL LENGTH: 450 pix NUMBER OF OBJECTS: 3 | FILL TYPE: Image SYNTHESIS: POP2 (DST) IMAGE INFORMATION | FILL TYPE: Image SYNTHESIS: ROP2 (SRC) IMAGE INFORMATION | FILL TYPE: Image SYNTHESIS: ROP2 (SRC) IMAGE INFORMATION |
|---|---|---|---|---|
| 601 | CLOSED AREA CONTROL INFORMATION 621 | OBJECT INFORMATION (IMAGE 611) | OBJECT INFORMATION (IMAGE 612) | OBJECT INFORMATION (IMAGE 613) |

FIG. 7A

ATTRIBUTE SYNTHESIS PROCESSING

OVERLAPPING RENDERING AREA 701

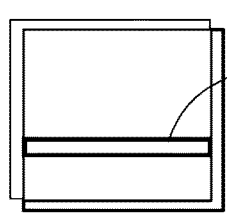

ATTRIBUTE IMAGE 712

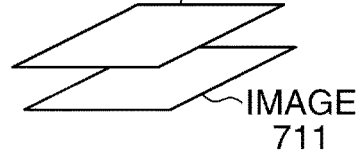

IMAGE 711

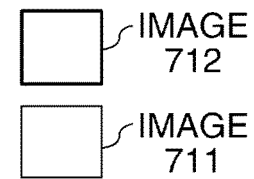

IMAGE 712

IMAGE 711

FIG. 7B

CONTROL INFORMATION AND OBJECT INFORMATION SENT VIA COMMUNICATION MEMORY 321

| OVERLAPPING RENDERING AREA | PIXEL LENGTH: 4960 pix NUMBER OF OBJECTS: 2 | FILL TYPE: Image SYNTHESIS: ROP2 (SRC) IMAGE INFORMATION | FILL TYPE: Image SYNTHESIS: ROP2 (ATTR) IMAGE INFORMATION |
|---|---|---|---|
| 701 | CLOSED AREA CONTROL INFORMATION | OBJECT INFORMATION (IMAGE 711) | OBJECT INFORMATION (IMAGE 712) |

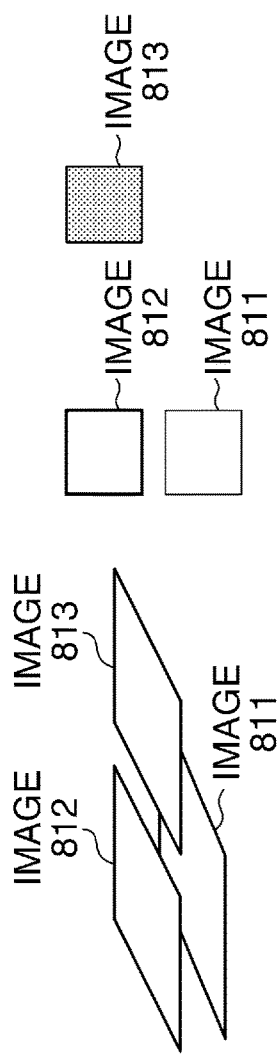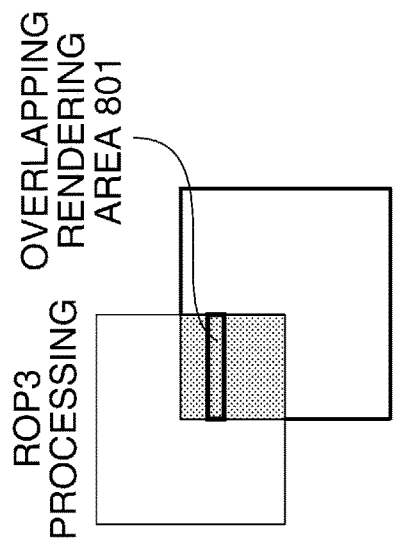

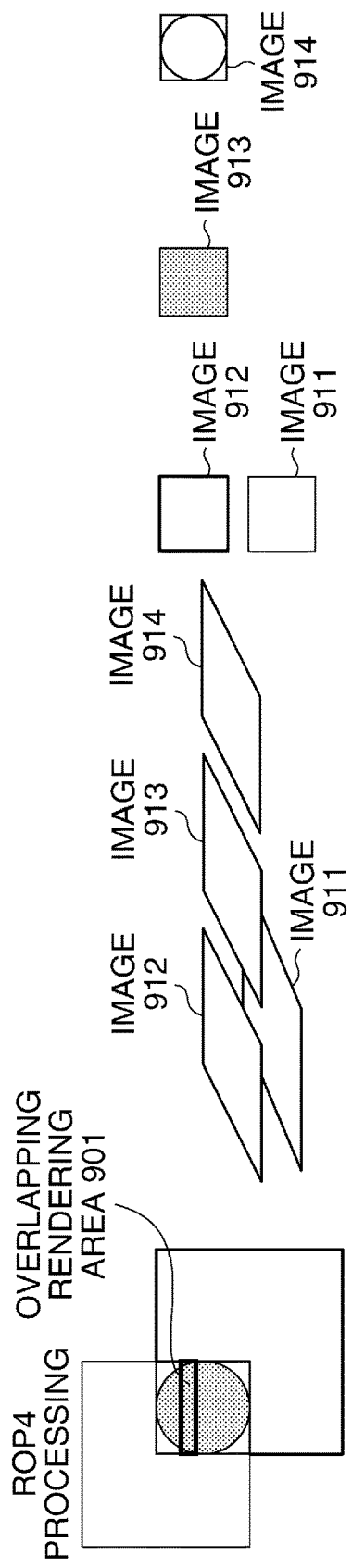

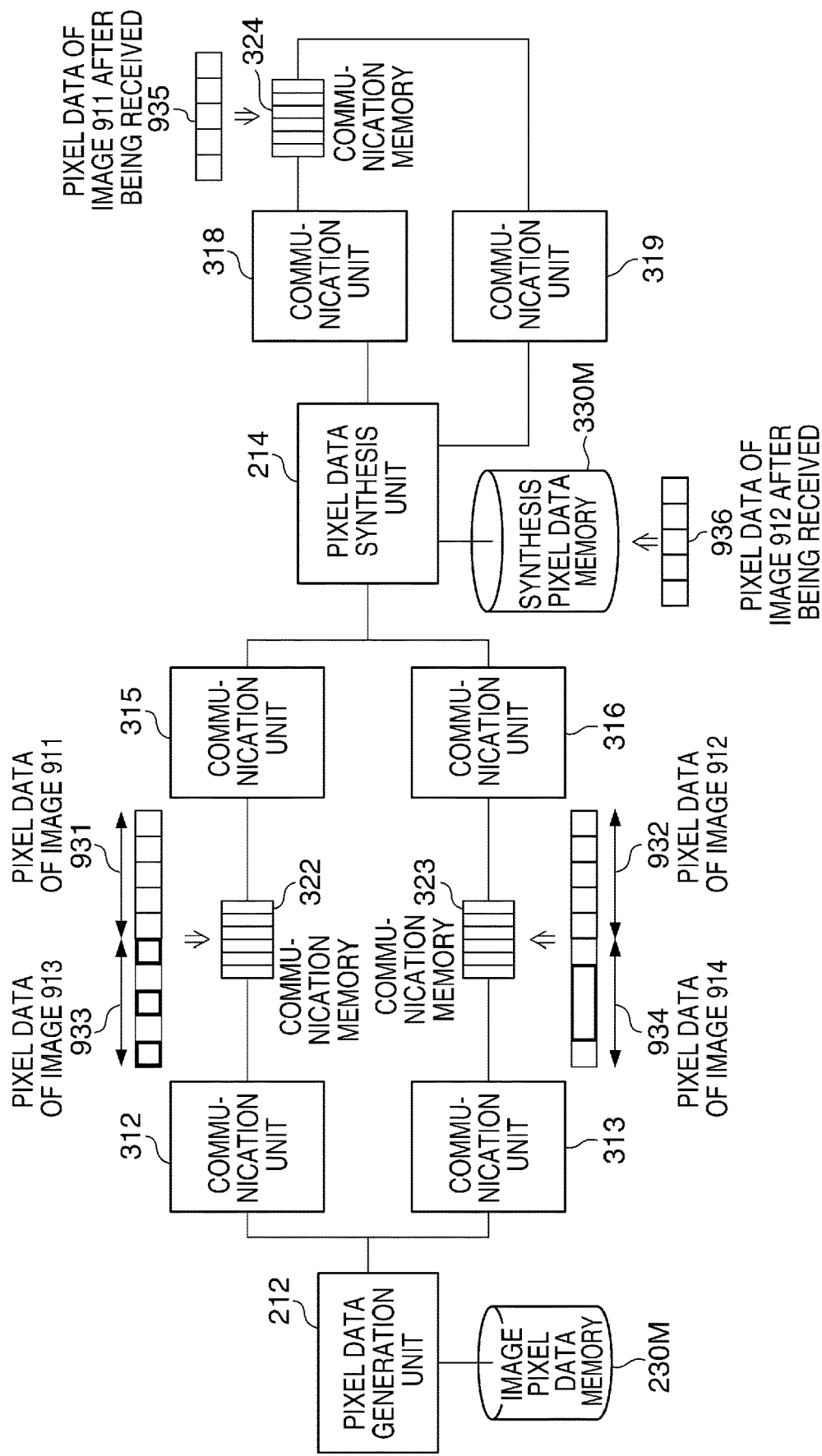

IMAGE PROCESSING APPARATUS THAT PERFORMS PIXEL SYNTHESIS PROCESSING AND IMAGE PROCESSING METHOD

BACKGROUND OF THE INVENTION

Field of the Invention

The present invention relates to an image processing apparatus and an image processing method, and more particularly to a technique of pixel synthesis processing.

Description of the Related Art

Conventionally, there has been known a technique for realizing high-speed synthesis processing by arranging pixel data to be synthesized in image formation processing in a memory that can be accessed at high speed, acquiring the pixel data from this memory in synthesis processing, and synthesizing the pixel data. Under such a background, according to a technique disclosed in Japanese Laid-Open Patent Publication (Kokai) No. 2009-278468, one communication memory that can be accessed at high speed is used as the above-mentioned memory, and synthesis processing is performed while arranging pixel data in this communication memory as much as possible. With this, pieces of pixel data of a plurality of objects to be synthesized are alternately output to the communication memory, whereby synthesis processing is realized without acquiring unnecessary pixel data from the communication memory.

However, in Japanese Laid-Open Patent Publication (Kokai) No. 2009-278468, when performing synthesis processing, only after the pixel data of one of the objects is acquired first, the pixel data of the other object can be acquired. Therefore, it takes time to acquire the pieces of pixel data of the plurality of objects to be synthesized, which makes it impossible to realize high-speed synthesis processing.

SUMMARY OF THE INVENTION

The present invention provides an image processing apparatus and an image processing method that make it possible to perform pixel synthesis processing at high speed.

In a first aspect of the present invention, there is provided an image processing apparatus that performs synthesis processing for an area where a first object and a second object overlap each other, comprising first and second storage units, a first processing unit which stores first pixel data, which corresponds to the area, of pixel data of the first object, in the first storage unit, and store second pixel data, which corresponds to the area, of pixel data of the second object, in the second storage unit, and a second processing unit configured to acquire the first and second pixel data from the first and second storage units, respectively, and perform synthesis processing of the acquired first and second pixel data.

In a second aspect of the present invention, there is provided an image processing method for an image processing apparatus that includes first and second storage units, and performs synthesis processing for an area where a first object and a second object overlap each other, comprising storing first pixel data, which corresponds to the area, of pixel data of the first object, in the first storage unit, and storing second pixel data, which corresponds to the area, of pixel data of the second object, in the second storage unit, and acquiring the first and second pixel data from the first and second storage units, respectively, and performing synthesis processing of the acquired first and second pixel data.

According to the present invention, it is possible to perform pixel synthesis processing at high speed.

Further features of the present invention will become apparent from the following description of exemplary embodiments (with reference to the attached drawings).

BRIEF DESCRIPTION OF THE DRAWINGS

FIG. 3B is a diagram showing a connection state of communication units and communication memories of the RIP.

FIG. 5A is a diagram useful in explaining an overlapping rendering area in a case where two images overlap.

FIG. 5B is a diagram useful in explaining control information and object information used when ROP2/alpha processing is performed on the overlapping rendering area shown in FIG. 5A.

FIG. 5C is a conceptual diagram showing a first manner of use of communication routes of the RIP in a pixel data synthesis process performed in a corresponding step in FIG. 4.

FIG. 6A is a diagram useful in explaining an overlapping rendering area in a case where three images overlap.

FIG. 6B is a diagram useful in explaining control information and object information used when ROP2/alpha processing is performed on the overlapping rendering area shown in FIG. 6A.

FIG. 7A is a diagram useful in explaining an overlapping rendering area in a case where two images overlap.

FIG. 7B is a diagram useful in explaining control information and object information used when attribute synthesis processing is performed on the overlapping rendering area shown in FIG. 7A.

FIG. 8A is a diagram useful in explaining an overlapping rendering area in a case where three images overlap.

FIG. 8B is a diagram useful in explaining control information and object information used when ROP3 processing is performed on the overlapping rendering area shown in FIG. 8A.

FIG. 9A is a diagram useful in explaining an overlapping rendering area in a case where four images overlap.

FIG. 9B is a diagram useful in explaining control information and object information used when ROP4 processing is performed on the overlapping rendering area shown in FIG. 9A.

FIG. 9C is a conceptual diagram showing a fifth manner of use of the communication routes of the RIP in the pixel data synthesis process performed in the corresponding step in FIG. 4.

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to the solution according to the invention.

An embodiment of the present invention will be described below with reference to the drawings.

Figure 1:
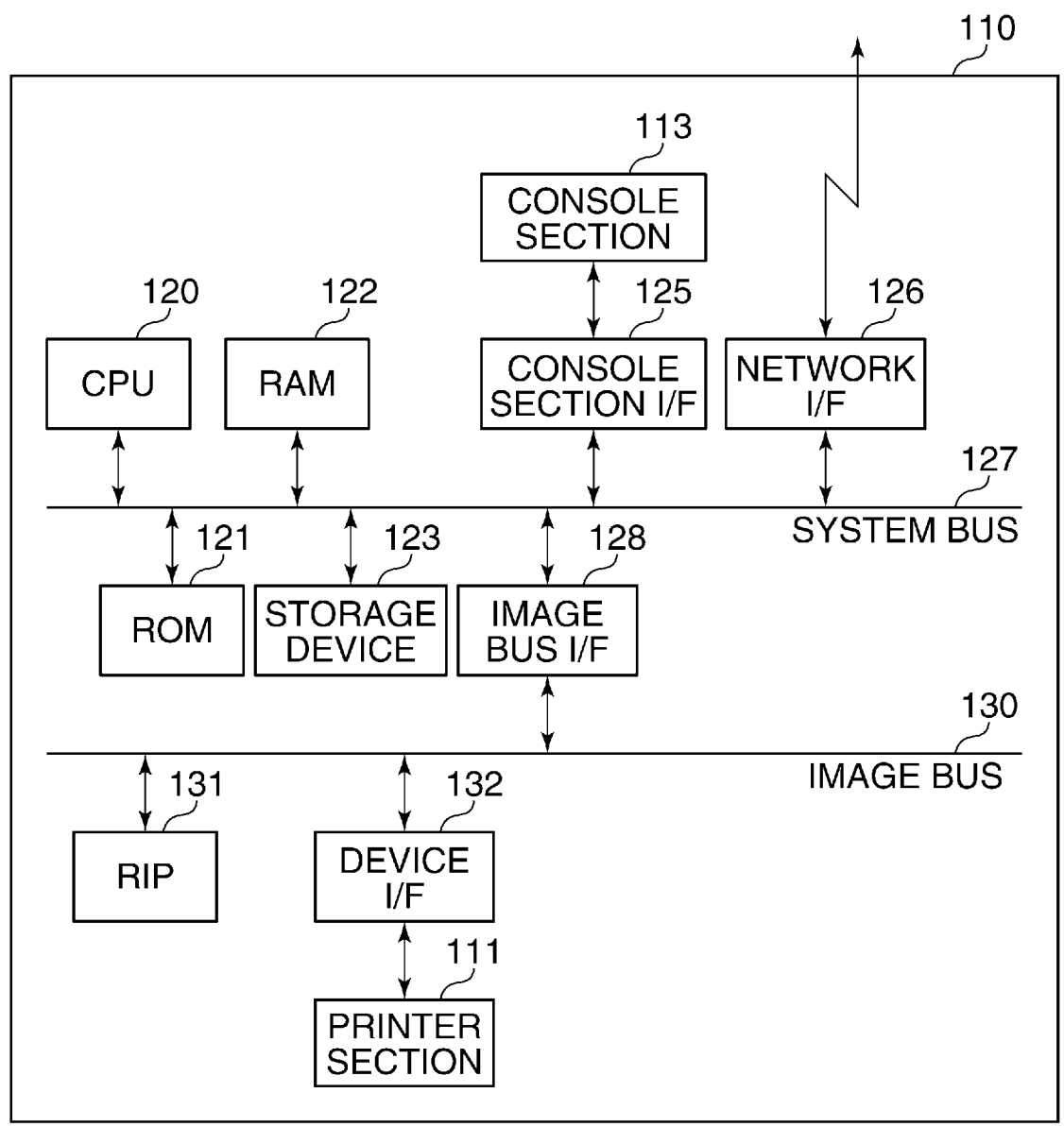
FIG. 1 is a diagram showing a hardware configuration of an image processing apparatus according to an embodiment of the present invention.
Figure 2:
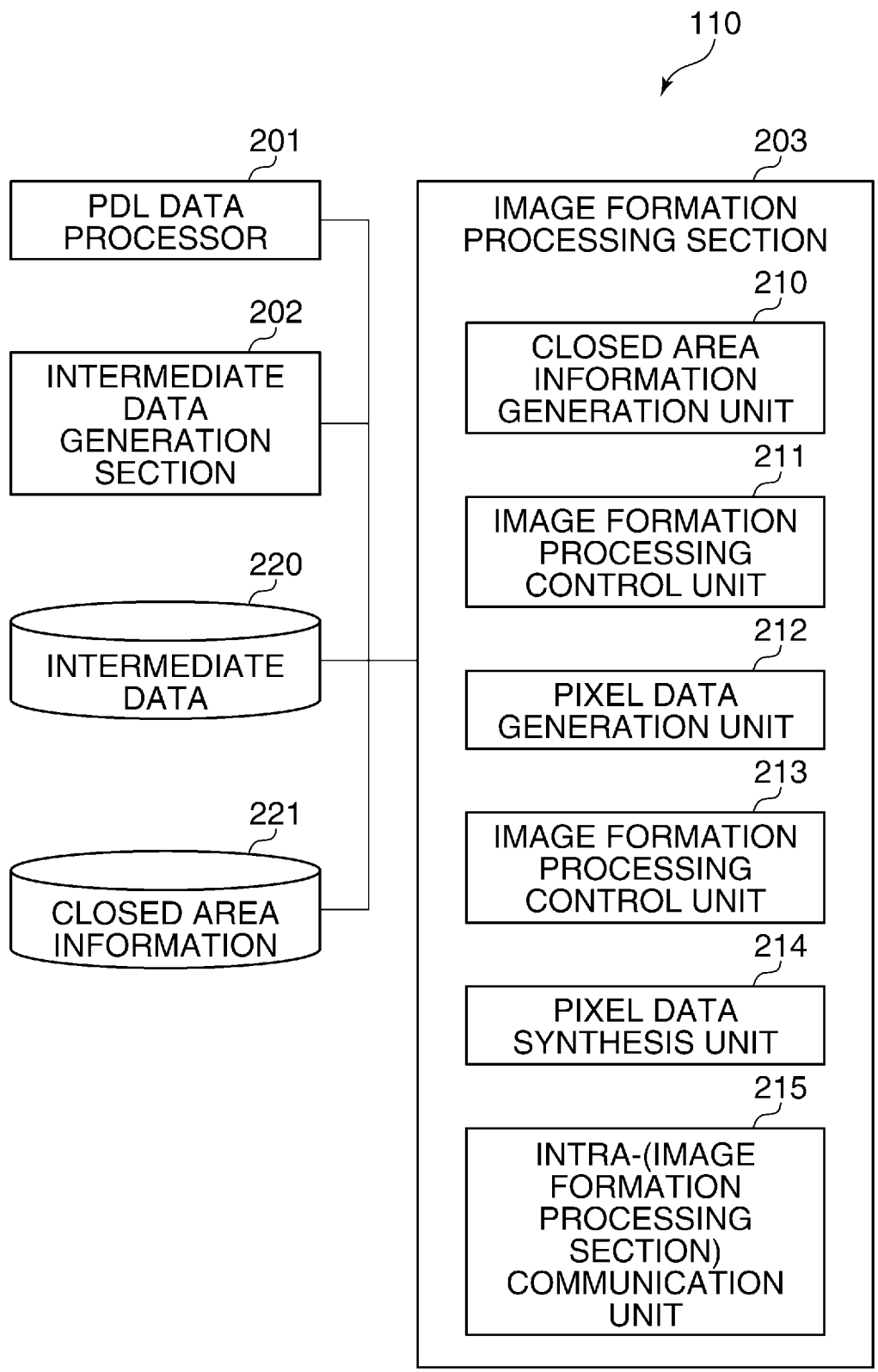
FIG. 2 is a diagram showing the software configuration of the image processing apparatus shown in FIG. 1.

FIGS. 1 and 2 are diagrams of system configuration of the embodiment of the present invention. In this system, a host computer, not shown, and an image processing apparatus 110 are connected to each other via a LAN.

A user generates PDL (Page Description Language) data indicative of page information to be printed on the host computer, and transfers the generated PDL data to the image processing apparatus 110. The image processing apparatus 110 performs print processing based on the transferred PDL data. Although in the present embodiment, the image processing apparatus 110 is an MFP (Multi-Function Printer), this is not limitative, but for example, the image processing apparatus 110 may be an SFP (Single-Function Printer).

The hardware configuration of the image processing apparatus 110 will be described with reference to FIG. 1.

Referring to FIG. 1, the image processing apparatus 110 includes a printer section 111 as an image output device. Further, the image processing apparatus 110 is connected to the LAN via a network interface 126 to thereby perform control for inputting and outputting PDL data and device information via the LAN. The printer section 111 is connected to a device interface 132, and outputs image data generated by the image processing apparatus 110 onto sheets. A CPU 120 is a central processing unit for controlling the overall operation of the image processing apparatus 110. A RAM 122 is a system work memory for the operation of the CPU 120. Further, the RAM 122 is used as a work area for performing rendering based on received PDL data and intermediate data generated within the image processing apparatus 110 for print processing, and is also used as a memory for temporarily storing input image data. A ROM 121 is a boot ROM, and stores a boot program of the system. A storage device 123 is a hard disk drive, and stores system software for performing various processing operations and received PDL data. A console section interface 125 is an interface with a console section 113 including a display screen capable of displaying various menus, print data information, and so forth, and outputs operation screen data to the console section 113. Further, the console section interface 125 has a function of transferring information input by an operator from the console section 113 to the CPU 120. The network interface 126 is connected to the LAN to input and output information from and to an external apparatus. The components described above are arranged on a system bus 127. An image bus interface 128 is an interface for connecting between the system bus 127 and an image bus 130 that transfers image data at high speed, and is a bus bridge for converting a data structure. A RIP (raster image processor) 131 and the device interface 132 are connected to the image bus 130.

The RIP 131 analyzes a page description language (PDL) data code and intermediate data (display list), and rasterizes the data into images. Note that the RIP 131 is formed by a plurality of CPUs (hereinafter referred to as the image formation processors), which are different from the CPU 120. The device interface 132 connects the printer section 111 to the image bus 130, and performs synchronous/asynchronous conversion on image data.

FIG. 2 is a diagram showing the software configuration of the image processing apparatus 110 shown in FIG. 1.

Referring to FIG. 2, a PDL data processor 201 performs processing for acquiring page information and object information included in the page information, from PDL data received by the image processing apparatus 110, and passing the acquired information to an intermediate data generation section 202. Based on the page information and the object information which are passed from the PDL data processor 201, the intermediate data generation section 202 performs processing for generating intermediate data 220 to be used for image formation processing.

An image formation processing section 203 performs processing for generating bitmap data corresponding to image information, based on the intermediate data 220 passed from the intermediate data generation section 202 for use in image formation processing. As shown in FIG. 2, the image formation processing section 203 includes units (210 to 215) necessary for image formation. First, a closed area information generation unit 210 performs processing for generating closed area information 221 of closed areas formed by outlines of objects, based on the intermediate data 220 to be used for image formation, which is passed from the intermediate data generation section 202. The closed area information 221 is generated by a known method. Note that, in the present embodiment, a pixel data generation process and the like, described hereinafter, are performed on a line-by-line basis in a lateral direction corresponding to a main scanning direction, and the closed area information 221 is information on sections (closed areas) which are divided by respective edges of opposite ends of one or more objects (which may overlap each other) existing on each line. In other words, the aforementioned "outline of an object" refers to, in terms of actual processing, top and bottom boundaries extending in the lateral direction defining each line and opposite ends of each section defined above. Next, an image formation processing control unit 211 instructs and controls a pixel data generation unit 212 to generate pieces of pixel data each included in a closed area, based on the closed area information 221 passed from the closed area information generation unit 210. Further, the image formation processing control unit 211 instructs and controls an image formation processing control unit 213, described hereinafter, to synthesize the pieces of pixel data generated by the pixel data generation unit 212. This processing will be described in detail hereinafter with reference to FIG. 12.

The pixel data generation unit 212 generates pieces of pixel data each included in a closed area, based on the closed area information 221 according to the instruction from the image formation processing control unit 211. Further, the pixel data generation unit 212 passes the generated pieces of pixel data to a pixel data synthesis unit 214. This processing will be described in detail hereinafter with reference to FIGS. 10 and 11.

The image formation processing control unit 213 instructs and controls the pixel data synthesis unit 214 to synthesize the pieces of pixel data each included in a closed area, based on the closed area information 221 and the instruction from the image formation processing control unit 211. This processing will be described in detail hereinafter with reference to FIG. 12.

The pixel data synthesis unit 214 synthesizes the pieces of pixel data passed from the pixel data generation unit 212 into a piece of pixel data included in the closed area, based on the instruction from the image formation processing control unit 213. This processing will be described in detail hereinafter with reference to FIG. 12 and the following figures.

An intra-(image formation processing section) communication unit 215 is formed by communication units 310 to 319, described hereinafter with reference to FIG. 3A.

The PDL data processor 201 and the intermediate data generation section 202 are configured to operate on the above-mentioned CPU 120 in the present embodiment, for example. Further, the image formation processing section 203 and the units (210 to 215) included therein are configured to operate on the image formation processors included in the above-mentioned RIP 131, for example. The hardware configuration of the image formation processors on which the units (210 to 215) operate will be described hereinafter with reference to FIG. 3B.

Figure 3A:
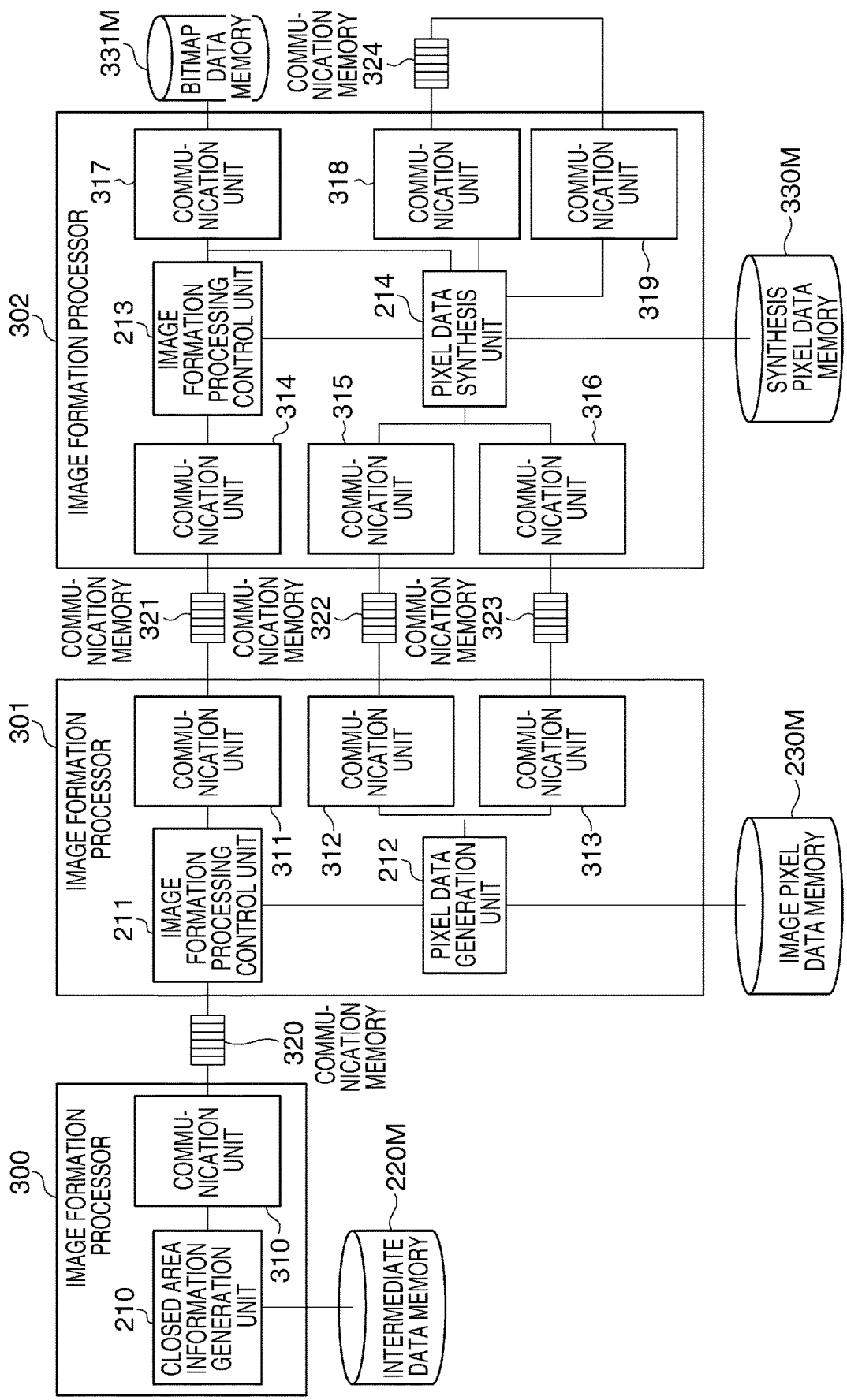
FIG. 3A is a diagram showing the hardware and software configurations of an RIP appearing in FIG. 1.

FIGS. 3A and 3B are diagrams of the hardware and software configurations within the RIP 131 appearing in FIG. 1.

As shown in FIG. 3A, the RIP 131 is formed by the plurality of image formation processors, denoted by reference numerals 300 to 302. The image formation processors 300 to 302 transmit instructions, such as operation commands sent thereto, and data, to communication memories 320 to 324 via the communication units 310 to 319 provided therein, respectively. Each of the communication units 310 to 319 in the present embodiment is a data transmission and reception circuit that sends a data storage request to a downstream component to thereby cause data received from an upstream component to be transferred to (stored in) the downstream component, or sends a data acquisition request to the upstream component to thereby acquire data from the upstream component and transfer (send) the acquired data to the downstream component. The upstream and downstream components in the present example are determined by the arrangement of each of the communication units 310 to 319. For example, the upstream and downstream components of the communication unit 315 are the communication memory 322 and the pixel data synthesis unit 214, respectively, and the upstream and downstream components of the communication unit 318 are the pixel data synthesis unit 214 and the communication memory 324, respectively. Further, the upstream and downstream components of the communication unit 319 are the communication memory 324 and the pixel data synthesis unit 214, respectively. These are an example in the arrangement shown in FIG. 3A. All of the communication memories in the present embodiment are each a memory of a FIFO type (so-called FIFO memory). By employing the FIFO memory, storage of pixel data in each communication memory and acquisition of the same therefrom are simplified. Further, it is possible to acquire pixel data at high speed, as described hereinafter. In the present embodiment, the closed area information generation unit 210 operates on the image formation processor 300 to perform its processing. Further, the image formation processing control unit 211 and the pixel data generation unit 212 operate on the image formation processor 301 to perform their processing. Further, the image formation processing control unit 213 and the pixel data synthesis unit 214 operate on the image formation processor 302 to perform their processing.

The closed area information generation unit 210 generates the closed area information 221 based on the intermediate data 220 stored in an intermediate data memory 220M, and sends the generated closed area information 221 to the image formation processor 301 via the communication unit 310 using the communication memory 320. The image formation processing control unit 211 instructs and controls the pixel data generation unit 212 to generate pieces of pixel data each included in a closed area, based on the closed area information 221 sent from the image formation processor 300. Further, the image formation processing control unit 211 sends information indicating an instruction and control for synthesizing the pieces of pixel data generated by the pixel data generation unit 212 to the image formation processing control unit 213 via the communication unit 311 using the communication memory 321. This information includes operation commands and information indicating acquisition sources of the pixel data, and is used when synthesis operation is executed by the pixel data synthesis unit 214.

Next, the pixel data generation unit 212 generates pieces of pixel data each included in a closed area, based on the closed area information 221 according to the instruction from the image formation processing control unit 211, using an image pixel data memory 230M. Then, the pixel data generation unit 212 sends a generated piece of pixel data to the pixel data synthesis unit 214 via the communication unit 312 using the communication memory 322. Further, the pixel data generation unit 212 sends a generated piece of pixel data to the pixel data synthesis unit 214 via the communication unit 313 using the communication memory 323. More specifically, the communication units 312 and 313 send pixel data storage requests (Push Req) to the communication memories 322 and 323 to thereby cause the pieces of pixel data to be stored in the communication memories 322 and 323, respectively. That is, the pieces of pixel data are each stored at the tail of a FIFO memory forming an associated one of the communication memories 322 and 323. As described hereinafter, the stored pieces of pixel data are output from the communication memories 322 and 323 to the communication units 315 and 316 in response to pixel acquisition requests (Pop Req) from the communication units 315 and 316, respectively, and are thereby acquired by the pixel data synthesis unit 214.

The image formation processing control unit 213 instructs and controls the pixel data synthesis unit 214 to synthesize the pieces of pixel data each included in a closed area, based on the closed area information 221 sent from the communication memory 321 via the communication unit 314. The pixel data synthesis unit 214 synthesizes the piece of pixel data sent via the communication memory 322 and the piece of pixel data sent via the communication memory 323 into a piece of pixel data included in a closed area, according to the instruction from the image formation processing control unit 213. Further, the pixel data synthesis unit 214 synthesizes a piece of pixel data included in a closed area, additionally using a piece of pixel data received from the communication memory 324 via the communication unit 319 as well, according to an instruction from the image formation processing control unit 213.

The pixel data synthesis unit 214 performs processing for acquiring pieces of pixel data for use in synthesis operation (pixel data acquisition processing). In this pixel data acquisition processing, the pixel data synthesis unit 214 sends a pixel data acquisition request to a communication memory selected as a pixel data acquisition source. The communication memory as the FIFO memory, which has received the acquisition request, outputs the piece of pixel data stored in the head thereof to the pixel data synthesis unit 214. Here, the RIP 131 in the present embodiment employs a configuration in which a system clock is provided to supply a common clock signal to at least the image formation processor 302 and the communication memories 322 and 323. This enables the image formation processor 302 to simultaneously send two pixel data acquisition requests to the separate communication memories 322 and 323 at the same timing synchronized with the system clock, and enables the communication memories 322 and 323 to receive the respective acquisition requests at the same timing, and output the respective pieces of pixel data to the communication units 315 and 316 at the same timing synchronized with the system clock. With this configuration, the image formation processor 302 (pixel data synthesis unit 214) can simultaneously acquire the two pieces of pixel data. Further, the image formation processor 302 can perform synthesis operation for the two acquired pieces of pixel data more quickly than in a case where the two pieces of pixel data are sequentially acquired. Note that even if the acquisition requests are not sent at the same timing, the communication memories 322 and 323 each can handle the received acquisition request independently of each other. Therefore, the communication memories 322 and 323 can quickly output the respective pieces of pixel data without generating a delay due to conflict of the acquisition requests as caused in the conventional case.

As described above, the pixel data synthesis unit 214 performs a type of synthesis operation according to the received operation command. In this synthesis operation, from which communication memory (pixel data acquisition source) the pixel data synthesis unit 214 should receive a piece of pixel data is selected according to the instruction from the image formation processing control unit 213. The process for selecting the communication unit 315 or 316 to acquire pixel data to be used by the pixel data synthesis unit 214 to perform synthesis processing will be described hereinafter with reference to FIG. 14.

Next, a description will be given how communication processing between the pixel data generation unit 212 and the pixel data synthesis unit 214 is realized using the communication units 312 to 316 and the communication memories 322 and 323, in terms of the hardware configuration, with reference to FIG. 3B. When the pixel data generation unit 212 performs communication using the communication memory 322, the pixel data generation unit 212 issues a false signal (value of 0) as a "com_route_0_kill" signal to the communication unit 312. Further, the pixel data generation unit 212 sets a piece of pixel data, which is desired to send, as a "Data In" signal at the same time, and outputs the "Data In" signal. In response to this, the communication unit 312 inverts the com_route_0_kill signal, and outputs the inverted signal as a "Push Req" signal. For example, if the "com_route_0_kill" signal is false, the inverted value becomes true (value of 1). By outputting the "Push Req" signal which is set to be true to a communication memory control unit 341 of the communication memory, which performs storage control of the communication memory 322, it is possible to store a piece of pixel data set as the "Data In" signal in the communication memory 322 (specifically, a SRAM 342 thereof). Further, if the "com_route_0_kill" signal is true, the inverted value becomes false. By outputting the "Push Req" signal which is set to be false to the communication memory control unit 341, the communication memory control unit 341 can ignore a piece of pixel data set as the "Data In" signal. This configuration applies to all of the communication memories 320 to 324 (In FIG. 3B, reference numeral 343 indicates a communication memory control unit, and reference numeral 344 indicates an SRAM). Next, when the pixel data synthesis unit 214 performs communication using the communication memory 322, the pixel data synthesis unit 214 issues a false signal (value of 0) as a "com_route_0_kill" signal to the communication unit 315. Further, since a piece of pixel data desired to be received is sent as a "Data Out" signal, and hence the pixel data synthesis unit 214 acquires the piece of pixel data from the "Data Out" signal. To do this, the communication unit 315 inverts the com_route_0_kill signal, and outputs the inverted signal as a "Pop Req" signal. For example, if the "com_route_0_kill" signal is false, the inverted value becomes true. By outputting the "Pop Req" signal which is set to be true to the communication memory control unit 341, it is possible to acquire a piece of pixel data set as the "Data Out" signal from the communication memory 322. Further, at this time, the communication memory control unit 341 deletes the piece of pixel data output as the "Data Out" signal, from the communication memory 322. Further, if the "com_route_0_kill" signal is true, the inverted value becomes false. By setting the "Pop Req" signal which is set to be false to the communication memory control unit 341, the communication memory control unit 341 continuously holds pixel data in the communication memory 322. This configuration applies to all of the communication memories 320 to 324.

A description will be given of a series of processing operations of a PDL printing process for printing PDL data transmitted by a user, which is executed by the CPU 120 on the image processing apparatus 110 according to the present embodiment. First, the CPU 120 loads a program to be executed from the ROM 121 into the RAM 122, and executes the program. With this, the image processing apparatus 110 causes the CPU 120 to execute the series of processing operations of the PDL printing process. First, PDL data is transmitted from the host computer to the image processing apparatus 110. Then, the CPU 120 stores the received PDL data in the storage device 123. Next, the CPU 120 acquires the stored PDL data, and analyzes the acquired PDL data. Next, the CPU 120 generates the intermediate data 220 necessary for generation of a bitmap image based on information of the analyzed PDL data. In the present example, the intermediate data is generated by using a known technique. Next, the CPU 120 performs rendering processing based on the generated intermediate data 220, to thereby generate bitmap data indicative of a page image, which is stored in a bitmap data memory 331M appearing in FIG. 3A.

Figure 4:
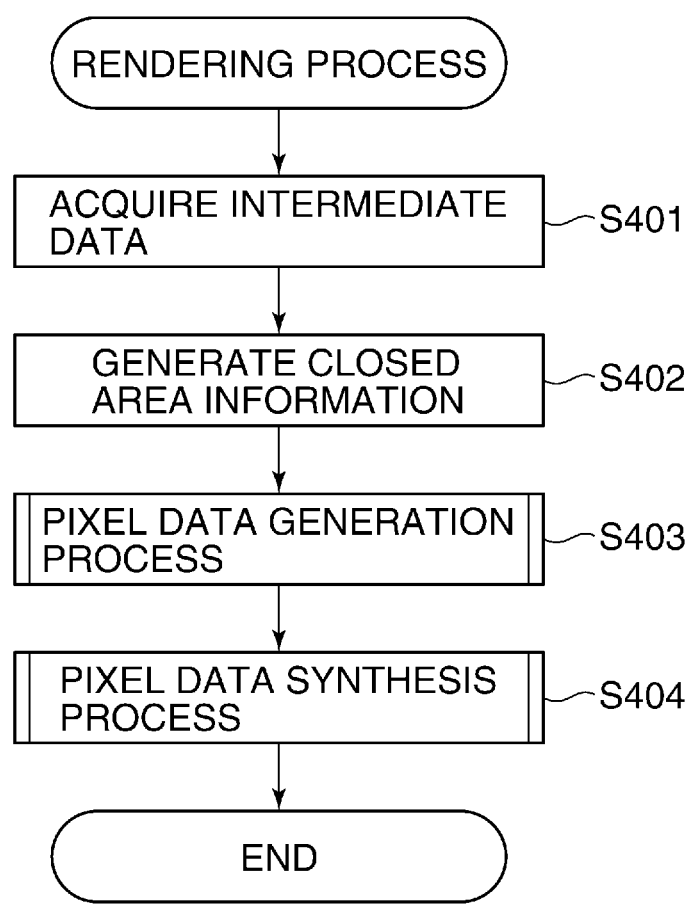
FIG. 4 is a flowchart of a rendering process in the present embodiment.

FIG. 4 is a flowchart of a rendering process in the present embodiment. The rendering process is performed by the RIP 131. In this rendering process, processing for simultaneously acquiring pieces of pixel data from the plurality of communication memories, which is a characteristic feature of the present invention, is performed, and then synthesis processing is performed.

First, the image formation processor 300 included in the RIP 131 acquires the intermediate data 220 generated by the intermediate data generation section 202 (step S401). Next, the image formation processor 300 generates the closed area information 221 of closed areas, based on the acquired intermediate data 220 (step S402). As described hereinbefore, the term "closed area" refers to an area formed by outlines of objects. Further, a known technique also described in the prior art documents is used concerning the closed area. For example, in FIG. 5A, a portion of part where two objects overlap each other is indicated as an area 501. This area is a closed area laterally defined by an outline of one object and an outline of the other object. Although illustrated with a large vertical width, for clarity, the vertical width corresponds to that of one line, as described hereinabove, and the top and bottom of this area correspond to upper and lower boundaries of one line. That is, this width corresponds to the vertical width of one line. Further, in this area 501, the two objects overlap each other, and hence this area 501 is also referred to as the overlapping rendering area. Therefore, the closed area information 221 is information on closed areas including the overlapping rendering area. Then, the image formation processor 300 sends the generated closed area information 221 to the image formation processor 301 using the communication memory 320. Next, the image formation processor 301 performs a pixel data generation process for generating pieces of pixel data each included in a closed area based on the acquired closed area information 221 (step S403). Then, the image formation processor 301 sends the generated pieces of pixel data to the image formation processor 302 using the communication memories 322 and 323. The pixel data generation process will be described in detail hereinafter. Next, the image formation processor 302 synthesizes the acquired pieces of pixel data (step S404). In a case where there is an unprocessed object in a closed area to be processed, a piece of pixel data formed by synthesis processing is output to the communication memory 324. Further, when the processing is completed for all objects included in the closed area to be processed, the pixel data is output as the bitmap data using the communication unit 317. This process will be described in detail hereinafter.

First, a first manner of use of communication routes of the RIP 131 in the pixel data synthesis process performed in the step S404 in FIG. 4 will be described with reference to FIGS. 5A, 5B, and 5C. More specifically, an overlapping rendering area 501 having two overlapping images will be described with reference to FIG. 5A, and control information and object information used when ROP2 processing or alpha processing is specified as synthesis processing to be performed for the overlapping rendering area 501 will be described with reference to FIG. 5B. Further, the routes of communication performed in the pixel data generation process (step S403) and the pixel data synthesis process (step S404) in FIG. 4 using the control information and object information shown in FIG. 5B will be described with reference to FIG. 5C.

In these processes, the pieces of pixel data are controlled to be arranged in associated ones of the communication memories as much as possible. This is because if the processing is performed while loading a piece of pixel data in a synthesis pixel data memory (hereinafter sometimes simply referred to as "the memory") 330M, it takes time to read and write the piece of pixel data from and into the memory. Therefore, a mechanism for performing processing while arranging the pieces of pixel data in the associated communication memories implemented by an SRAM which can be accessed at high speed will be described. In this mechanism, synthesis processing is performed while changing a communication memory to be used, according to the type of synthesis processing and the type of an object to be synthesized (fill type) which are specified in object information 522 and 523 appearing in FIG. 5B. This improves the use efficiency of each communication memory.

Referring to FIG. 5A, the overlapping rendering area 501 is an area in which an image 511 as one object and an image 512 as another object overlap each other. As shown in FIG. 5C, the pixel data generation unit 212 which performs processing on the image formation processor 301 sends a piece of pixel data 531 of the image 511 from the image pixel data memory 230M to the image formation processor 302 (pixel data synthesis unit 214) using the communication memory 322. Further, the pixel data generation unit 212 sends a piece of pixel data 532 of the image 512 overlapping the image 511 to the image formation processor 302 (pixel data synthesis unit 214) using the communication memory 323. In doing this, the piece of pixel data 531 is destination (dst) image pixel data, and the piece of pixel data 532 is source (src) image pixel data.

As described above, the pixel data generation unit 212 transfers the pieces of pixel data to be synthesized with each other to the pixel data synthesis unit 214 via the different communication memories 322 and 323, respectively. This enables the image formation processor 302 (the pixel data synthesis unit 214) to perform synthesis processing while storing the pieces of pixel data 531 and 532 in the communication memories 322 and 323, respectively. Details of processing for selecting a communication memory to be used, which is performed by the image formation processor 301 and the image formation processor 302, will be described hereinafter.

Figure 6C:
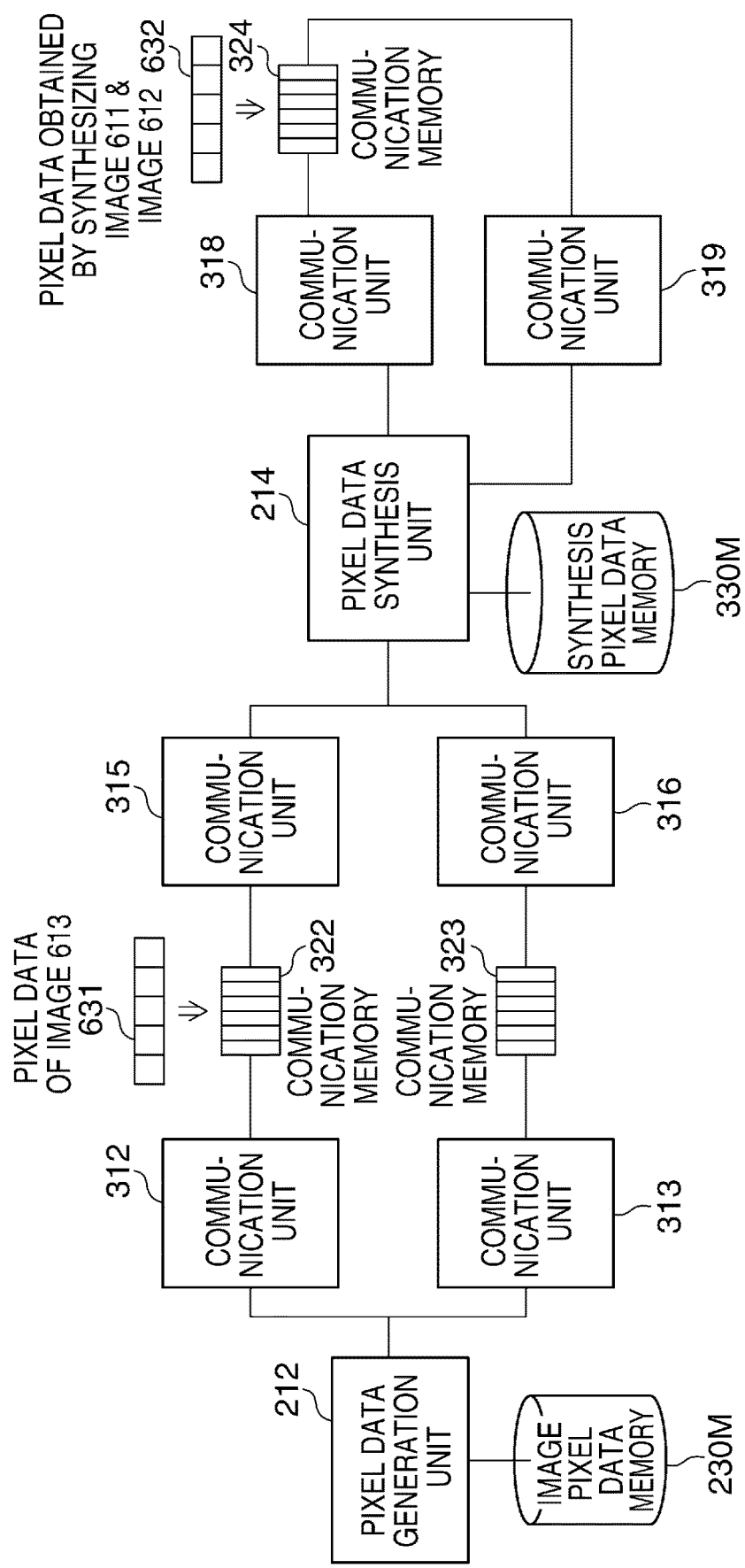
FIG. 6C is a conceptual diagram showing a second manner of use of the communication routes of the RIP in the pixel data synthesis process performed in the corresponding step in FIG. 4.

Next, a second manner of use of the communication routes of the RIP 131 in the pixel data synthesis process performed in the step S404 in FIG. 4 will be described with reference to FIGS. 6A, 6B, and 6C. More specifically, an overlapping rendering area 601 having three overlapping images will be described with reference to FIG. 6A, and control information and object information used when ROP2 processing or alpha processing is specified as synthesis processing to be performed for the overlapping rendering area 601 will be described with reference to FIG. 6B. Further, the routes of communication using the control information and object information shown in FIG. 6B will be described with reference to FIG. 6C.

Referring to FIG. 6A, the overlapping rendering area 601 is an area in which images 611, 612, and 613, as respective objects, overlap each other. The pixel data generation unit 212 which performs processing on the image formation processor 301 sends pieces of pixel data of the images 611 and 612 via the communication memories different from each other, similarly to the above-described method of transmission of the pieces of pixel data of the overlapping rendering area 501, shown in FIG. 5C. The image formation processor 302 synthesizes a piece of pixel data of the image 611 and a piece of pixel data of the image 612, which are sent from the communication memories 322 and 323 different from each other. In doing this, the piece of pixel data of the image 611 is destination image pixel data, and the piece of pixel data of the image 612 is source image pixel data.

Then, the image formation processor 302 judges that it is necessary to further synthesize the image 613 with the resulting image obtained by synthesizing the images 611 and 612, and sends a piece of pixel data 632 as the resulting image obtained by synthesizing the images 611 and 612 to the communication memory 324. Next, a piece of pixel data 631 of the image 613 is sent from the image formation processor 301 (pixel data generation unit 212) via the communication memory 322. The image formation processor 302 synthesizes the piece of pixel data 632 obtained by synthesizing the images 611 and 612, which has been saved in the communication memory 324, and the piece of pixel data 631 of the image 613 stored in the communication memory 322. In doing this, the piece of pixel data 632 is destination image pixel data, and the piece of pixel data 631 is source image pixel data. This realizes synthesis processing performed while arranging the pieces of pixel data 631 and 632 in the different communication memories 322 and 324, respectively.

Figure 7C:
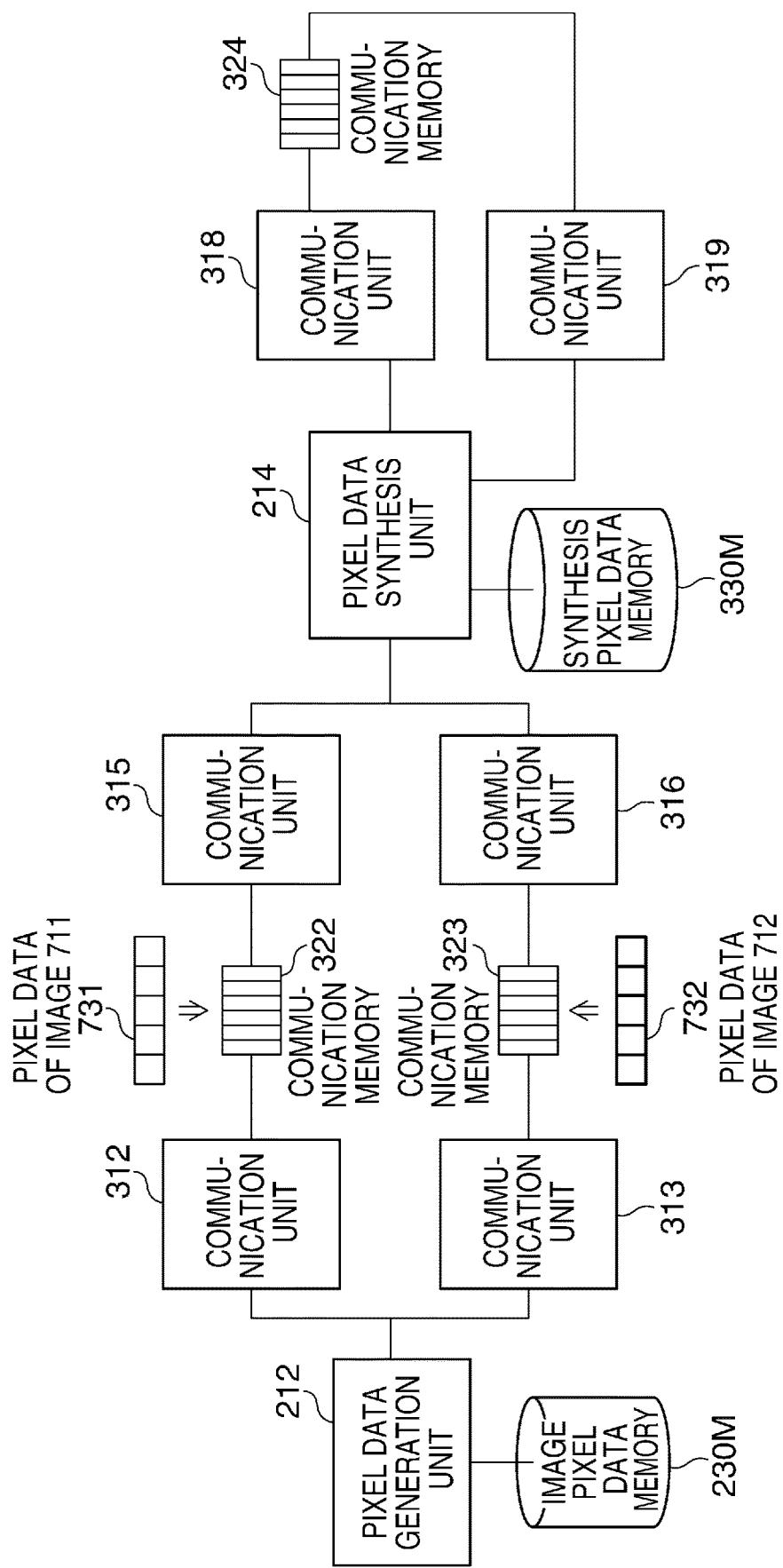
FIG. 7C is a conceptual diagram showing a third manner of use of the communication routes of the RIP in the pixel data synthesis process performed in the corresponding step in FIG. 4.

Next, a third manner of use of the communication routes of the RIP 131 in the pixel data synthesis process in FIG. 4 will be described with reference to FIGS. 7A, 7B, and 7C. More specifically, an overlapping rendering area 701 in which an image and an attribute image overlap each other will be described with reference to FIG. 7A. Further, control information and object information used when attribute synthesis processing (ROP2 (Attr)) is specified as synthesis processing to be performed for the overlapping rendering area 701 will be described with reference to FIG. 7B. Further, the routes of communication using the control information and object information shown in FIG. 7B will be described with reference to FIG. 7C.

Referring to FIG. 7A, the overlapping rendering area 701 is an area in which an image 711 and an attribute image 712 overlap each other. The attribute image is information indicating an original object type of each piece of pixel data, on a pixel-by-pixel basis, on which rendering processing has been performed, before performing attribute synthesis processing. The pixel data generation unit 212 which performs processing on the image formation processor 301 sends a piece of pixel data 731 of the image 711 to the image formation processor 302 using the communication memory 322, for example. Further, the pixel data generation unit 212 sends a piece of pixel data 732 of the attribute image 712 overlapping the image 711 to the pixel data synthesis unit 214 of the image formation processor 302 using the communication memory 323. The piece of pixel data 732 is attribute image pixel data. This enables the pixel data synthesis unit 214 to perform attribute synthesis processing while storing the pieces of pixel data 731 and 732 in the communication memories 322 and 323, respectively. Details of processing for selecting a communication memory to be used, which is performed by the image formation processor 301 and the image formation processor 302, will be described hereinafter.

Figure 8C:
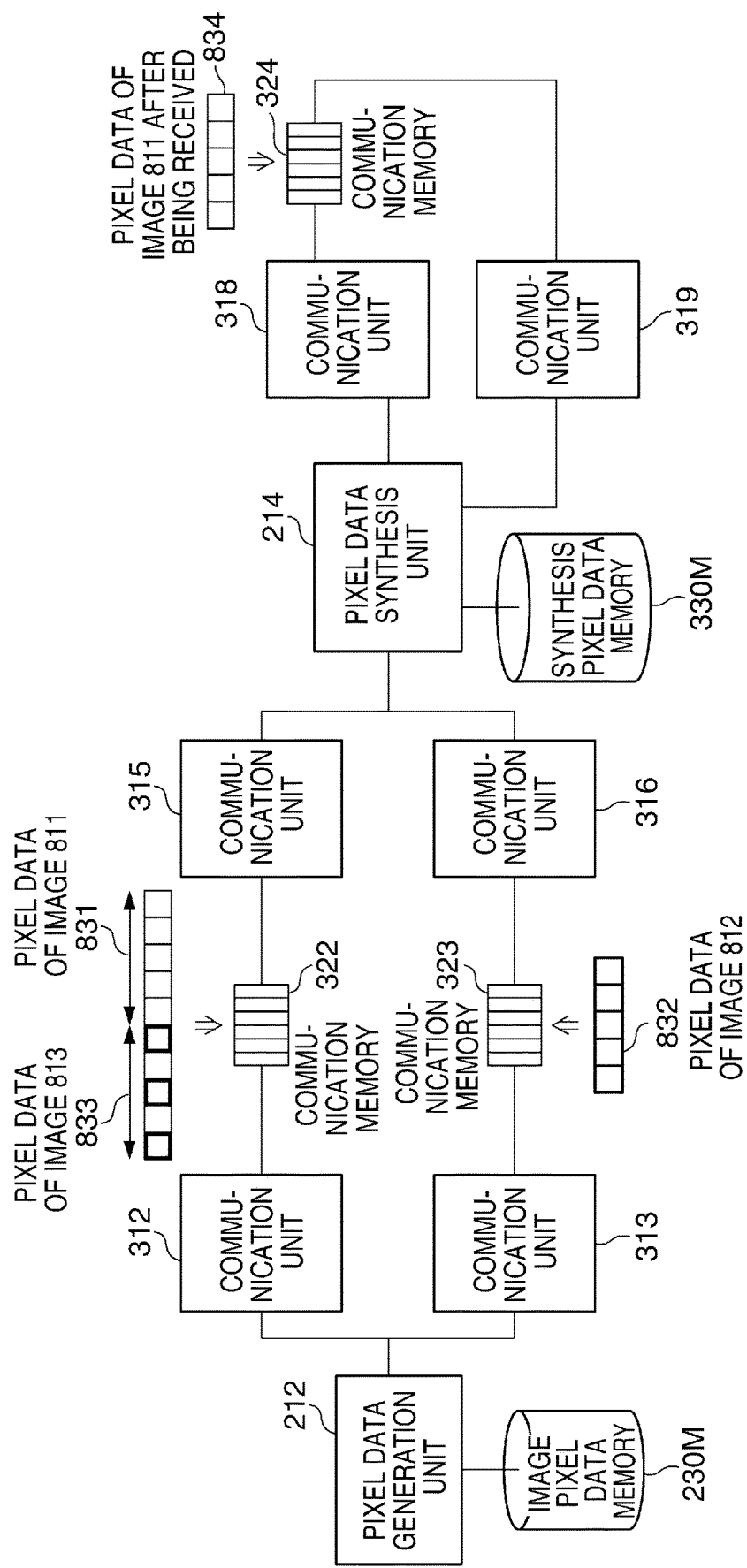
FIG. 8C is a conceptual diagram showing a fourth manner of use of the communication routes of the RIP in the pixel data synthesis process performed in the corresponding step in FIG. 4.

Next, a fourth manner of use of the communication routes of the RIP 131 in the pixel data synthesis process in FIG. 4 will be descried with reference to FIGS. 8A, 8B, and 8C. More specifically, an overlapping rendering area 801 having three overlapping images will be described with reference to FIG. 8A, and control information and object information used when ROP3 processing is specified as synthesis processing to be performed for the overlapping rendering area 801 will be described with reference to FIG. 8B. Further, the routes of communication using the control information and object information shown in FIG. 8B will be described with reference to FIG. 8C.

Referring to FIG. 8A, the overlapping rendering area 801 is an area in which images 811, 812, and 813 are to be subjected to synthesis by ROP3 processing. The pixel data generation unit 212 sends a piece of pixel data 831 of the image 811 and a piece of pixel data 832 of the image 812 to the pixel data synthesis unit 214 using the different communication memories 322 and 323, respectively. Further, the pixel data generation unit 212 sends a piece of pixel data 833 of the image 813 to the pixel data synthesis unit 214 using the communication memory 322. To perform ROP3 processing, the pixel data synthesis unit 214 necessitates the respective pieces of pixel data 831, 832, and 833 of the images 811, 812, and 813 at the same time in synthesis processing. In doing this, the piece of pixel data 831 is destination (dst) image pixel data, the piece of pixel data 832 is source (src) image pixel data, and the piece of pixel data 833 is pattern (pat) image pixel data.

However, since the communication memory 322 is a memory using the queuing method, the piece of pixel data 833 of the image 813 can be acquired only after receiving the piece of pixel data 831 of the image 811. Therefore, the pixel data synthesis unit 214 first receives the piece of pixel data 831 of the image 811, temporarily saves the piece of pixel data 831 into the communication memory 324 as a piece of pixel data 834 to thereby make it possible to receive the piece of pixel data 833 of the image 813, and then performs synthesis processing (ROP3). Details of processing for selecting a communication memory to be used, which is performed by the image formation processor 301 and the image formation processor 302, will be described hereinafter.

Next, a fifth manner of use of the communication routes of the RIP 131 in the pixel data synthesis process in FIG. 4 will be described with reference to FIGS. 9A, 9B, and 9C. More specifically, an overlapping rendering area 901 having four overlapping images will be described with reference to FIG. 9A, and control information and object information used when ROP4 processing is specified as synthesis processing performed for the overlapping rendering area 901 will be described with reference to FIG. 9B. Further, the routes of communication using the control information and object information shown in FIG. 9B will be described with reference to FIG. 9C.

Referring to FIG. 9A, the overlapping rendering area 901 is an area in which images 911, 912, 913, and 914 are to be subjected to synthesis by ROP4 processing. The pixel data generation unit 212 sends a piece of pixel data 931 of the image 911, a piece of pixel data 932 of the image 912, and a piece of pixel data 933 of the image 913 to the pixel data synthesis unit 214 via the communication memories 322 and 323. A transmission method used here is the same as that used for the overlapping rendering area 801 appearing in FIG. 8A. Further, the pixel data generation unit 212 sends a piece of pixel data 934 of the image 914 to the pixel data synthesis unit 214 using the communication memory 323. To perform ROP4 processing, the pixel data synthesis unit 214 necessitates the respective pieces of pixel data 931, 932, 933, and 934 of the images 911, 912, 913, and 914 at the same time in synthesis processing. In doing this, the piece of pixel data 931 is destination image pixel data, the piece of pixel data 932 is source image pixel data, and the piece of pixel data 933 is pattern image pixel data. Further, the piece of pixel data 934 is mask image pixel data.

However, unless the pieces of pixel data 931 and 932 of the images 911 and 912 are received, the communication memories 322 and 323 cannot acquire the subsequent pieces of pixel data 933 and 934. This is because the communication memories 322 and 323 are memories using the queuing method (FIFO memories). Further, only the communication memory 324 is provided as the communication memory for temporarily saving pixel data in ROP3 processing, and hence one of the pieces of pixel data 931 and 932, acquired first, is temporarily saved in the memory (synthesis pixel data memory 330M). Therefore, first, the pixel data synthesis unit 214 once receives the piece of pixel data 931 of the image 911, and saves the received piece of pixel data 931 into the communication memory 324 as a piece of pixel data 935. Next, upon receipt of the pixel data 932 of the image 912, the pixel data synthesis unit 214 saves the received pixel data 932 into the synthesis pixel data memory 330M as a piece of pixel data 936. This enables the pixel data synthesis unit 214 to receive the pieces of pixel data 933 and 934 of the images 913 and 914, and then perform synthesis processing. Details of processing for selecting a communication memory to be used, which is performed by the image formation processor 301 and the image formation processor 302, will be described hereinafter.

Figure 10:
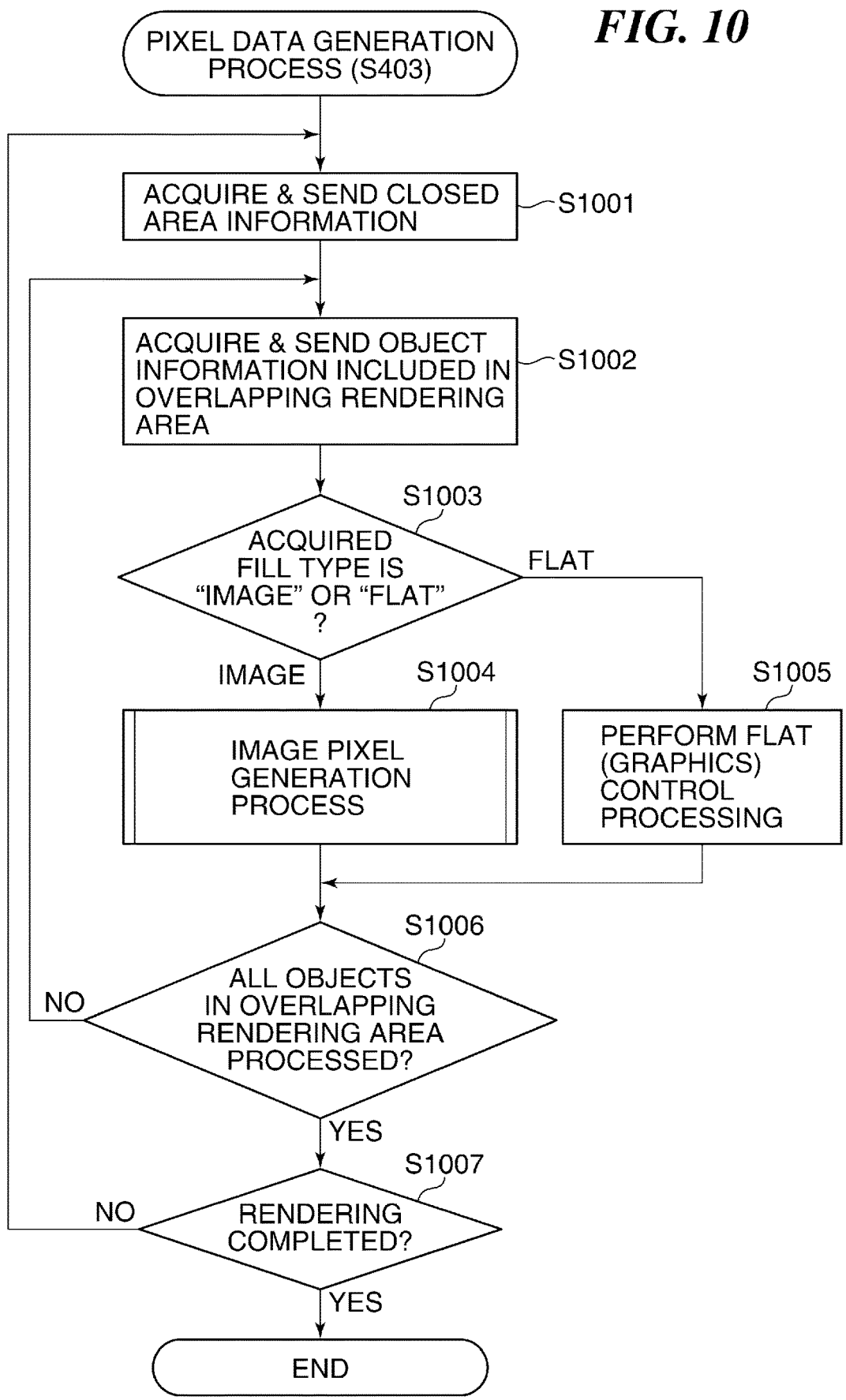
FIG. 10 is a flowchart of a pixel data generation process performed in a corresponding step in FIG. 4.

FIG. 10 is a flowchart of the pixel data generation process performed in the step S403 in FIG. 4. This process is performed by the image formation processor 301.

First, as described with reference to FIG. 3A, the image formation processor 301 acquires closed area information, and sends the acquired closed area information to the image formation processor 302 using the communication memory 322 (step S1001). Next, the image formation processor 301 acquires object information included in an overlapping rendering area, and sends the acquired object information to the image formation processor 302 using the communication memory 322 (step S1002).

After that, the image formation processor 301 determines a fill type based on the object information acquired in the step S1002 (step S1003), and if the fill type is "image", the image formation processor 301 proceeds to a step S1004, whereas the fill type is "graphics" (flat), the image formation processor 301 proceeds to a step S1005. An object having the fill type set to "image" refers to an object having an image attribute, such as a photograph, which is formed by pixels each having a color value. In this object, each pixel is referred to as a pixel having the image attribute. Further, an object having the fill type set to "flat" refers to an object expressed by shape information and color information of graphics, which is formed by pixels for which a single color value is determined. In this object, each pixel is referred to as a pixel having the graphics attribute. For example, an object having color information, such as a single color and linear gradation, is an object having the graphics (flat) attribute.

In the step S1004, the image formation processor 301 performs a process for generating image pixels based on the image information included in the fill type information set to "image", acquired in the step S1002. The image pixel generation process will be described in detail hereinafter.

In the step S1005, the image formation processor 301 performs processing for transferring color information for filling with flat color, based on the color information included in the fill type set to "flat", which is acquired in the step S1002. Although the above-mentioned pixels having the image attribute are different in color on a pixel-by-pixel basis, as for the fill type set to "flat" (filling with flat color), the same color is used for a predetermined area, and hence only control information to the effect that a specified area is to be filled with one predetermined color is transferred, without performing rasterization into pixels. This is a known technique, and hence the transfer processing is performed using the known technique.

Next, the image formation processor 301 determines whether or not the processing is completed for all objects included in the closed area based on the closed area information acquired in the step S1001 (step S1006). If it is determined that the processing is completed (YES to the step S1006), the image formation processor 301 proceeds to a step S1007, whereas if it is determined that the processing is not completed (NO to the step S1006), the image formation processor 301 returns to the step S1002.

In the step S1007, the image formation processor 301 determines whether or not the processing is completed for all closed areas included in the page. If it is determined that the processing is completed (YES to the step S1007), the image formation processor 301 terminates the present process, whereas if it is determined that the processing is not completed (NO to the step S1007), the image formation processor 301 returns to the step S1001.

Figure 11:
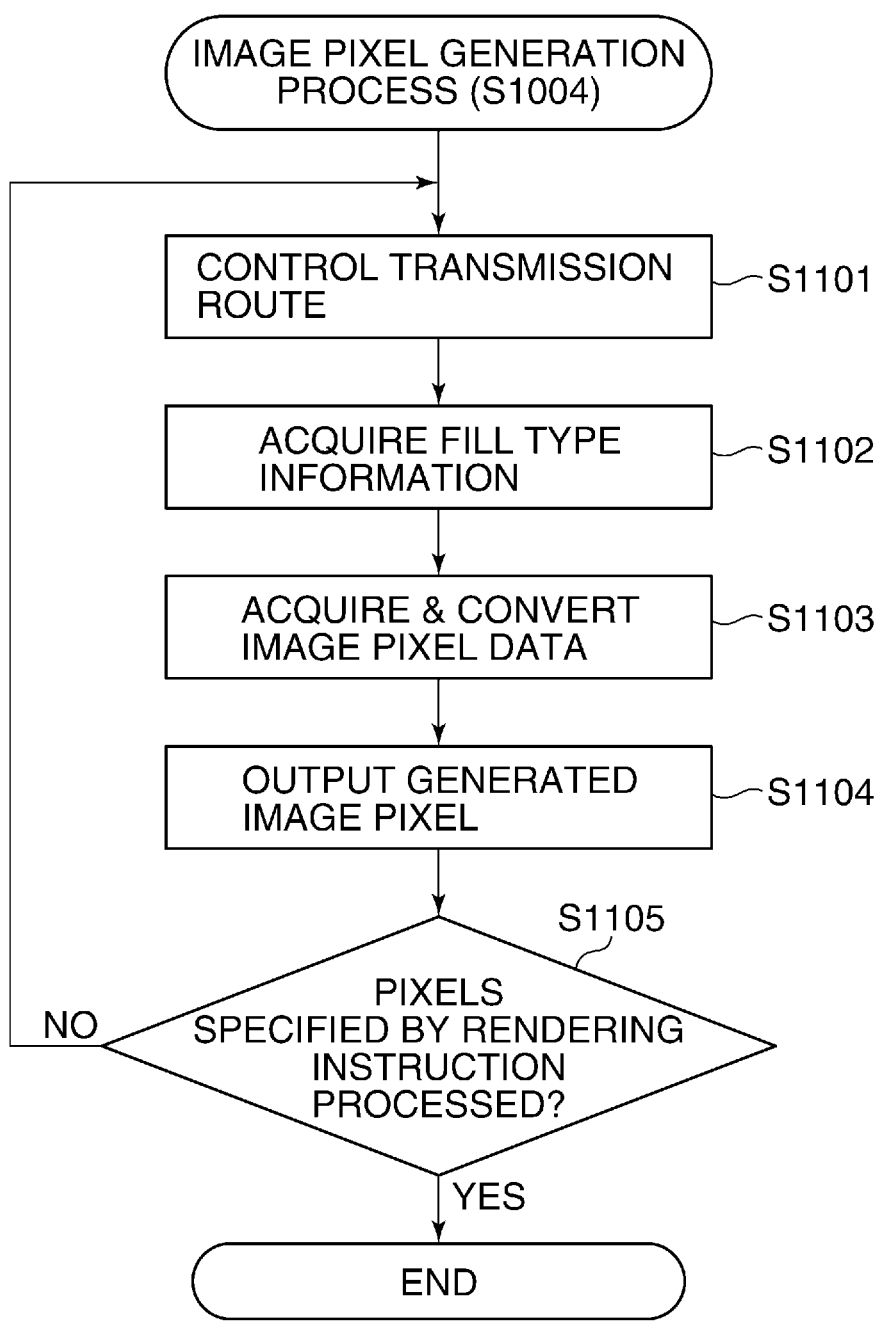
FIG. 11 is a flowchart of an image pixel generation process performed in a corresponding step in FIG. 10.

FIG. 11 is a flowchart of the image pixel generation process performed in the step S1004 in FIG. 10.

The present process is for generating pixel data of an object of the fill type set to "image", which is included in a closed area to be processed and acquired in the step S1002. First, the image formation processor 301 performs a transmission route control process for selecting a communication memory to be used for sending a generated piece of pixel data to the image formation processor 302 (step S1101). The image formation processor 301 sends information indicating the communication memory to be used to the image formation processor 302 via the communication memory 321. More specifically, values of rcv_com_route_dst, rcv_com_route_src, rcv_com_route_pat, and rcv_com_route_mask are sent.

For example, the image formation processor 301 causes a series of pieces of pixel data of one object, which are not required to be synthesized with any pieces of pixel data of other objects by the image formation processor 302, to be stored only in the communication memory 322, or only in the communication memory 323. Then, the image formation processor 301 sends information indicating which communication memory stores the series of pieces of pixel data to the image formation processor 302.

For example, there is a case where it is necessary to synthesize pieces of pixel data of two objects. In this case, the image formation processor 301 causes a series of pieces of pixel data of one of the two objects to be stored in the communication memory 322, and cause a series of pieces of pixel data of the other object to be stored in the communication memory 323. Further, the image formation processor 301 sends information indicating which communication memory stores which series of pieces of pixel data to the image formation processor 302.

Note that in the present embodiment, the storage destination of pieces of pixel data is alternately switched such that each generated one of the series of pieces of image pixel data is stored in the communication memory 322, and then an associated generated one of the series of pieces of image pixel data is stored in the communication memory 323. To this end, a process for setting and updating a variable for controlling the storage destination is performed. First, a variable updating process is performed for updating a variable snd_com_route_img indicative of the communication memory 322 or 323 to which currently generated image pixel data is to be sent. The present process is one of characteristic processes in the present embodiment, and the communication route is selected so as to make it possible to perform synthesis processing while holding the pixel data in one of the communication memories 322 and 323 as much as possible in the above-described pixel data synthesis process (step S404). When outputting the pixel data to the communication memory 322, the variable snd_com_route_img is set to 0. Further, when outputting the pixel data to the communication memory 323, the variable snd_com_route_img is set to 1. More specifically, a setting of a variable next_snd_com_img_route is updated in which a value indicating to which of the communication memory 322 or 323 the pixel data is to be output is set in advance. For example, if the output destination is set to the communication memory 322, i.e. if the value of the variable snd_com_route_img is set to 0, the image pixel data generated next is required to be output to the communication memory 323. Therefore, in this case, the value of the variable next_snd_com_img_route is set to 1. Further, if the output destination is set to the communication memory 323, i.e. if the value of the variable snd_com_route_img is set to 1, the image pixel data generated next is required to be output to the communication memory 322. Therefore, in this case, the value of the variable next_snd_com_img_route is set to 0. In short, as the actual variable control, the following first variable control processing is performed:

snd_com_route_img=next_snd_com_img_route;
next_snd_com_img_route_img=(next_snd_com_img_route+1) & 1;

Next, the image formation processor 301 acquires fill information from the object information included in the closed area to be processed, which has been acquired in the step S1002, and determined in the step S1003 that the fill type is "image" (step S1102). The fill information acquired in this step includes a ratio of magnification/reduction of the image and gradation and color format conversion information. This conversion information is set according to a user's instruction.

Next, the image formation processor 301 acquires pixel data from the communication memory 320, and converts the acquired pixel data according to the magnification/reduction rate and the gradation and color format conversion information, which is acquired in the step S1102 (step S1103). The acquisition processing is performed using DMA. The method of acquiring pixel data using DMA has already been put into practice in various known techniques, and hence the pixel data is acquired by using this known technique in the present process. In the step S1103, further, the pixel data acquired as above is converted based on the gradation and color format conversion information using a known technique, whereby pixel data of an image based on the user's instruction is generated. As described above, the image pixel acquisition and conversion in the step S1103 is performed using the known techniques.

Next, the image formation processor 301 outputs a piece of image pixel data generated by the image pixel acquisition and conversion in the step S1103, to a communication route using the communication memory selected in the step S1101 (step S1104). More specifically, in this step, the generated piece of image pixel data is output to the communication memory indicated by the value of the variable snd_com_route_img updated in the step S1101. If the variable snd_com_route_img is equal to 0, the generated piece of image pixel data is output to the communication memory 322. On the other hand, if the variable snd_com_route_img is equal to 1, the generated piece of pixel data is output to the communication memory 323.

Next, the image formation processor 301 determines whether or not a number of pixels to be generated (a number of pixels specified by the rendering instruction) included in the closed area information have been processed (step S1105). If it is determined that the specified number of pixels have not been processed, the image formation processor 301 returns to the step S1101, whereas if it is determined that the specified number of pixels have been processed, the image formation processor 301 terminates the present process.

Figure 12:
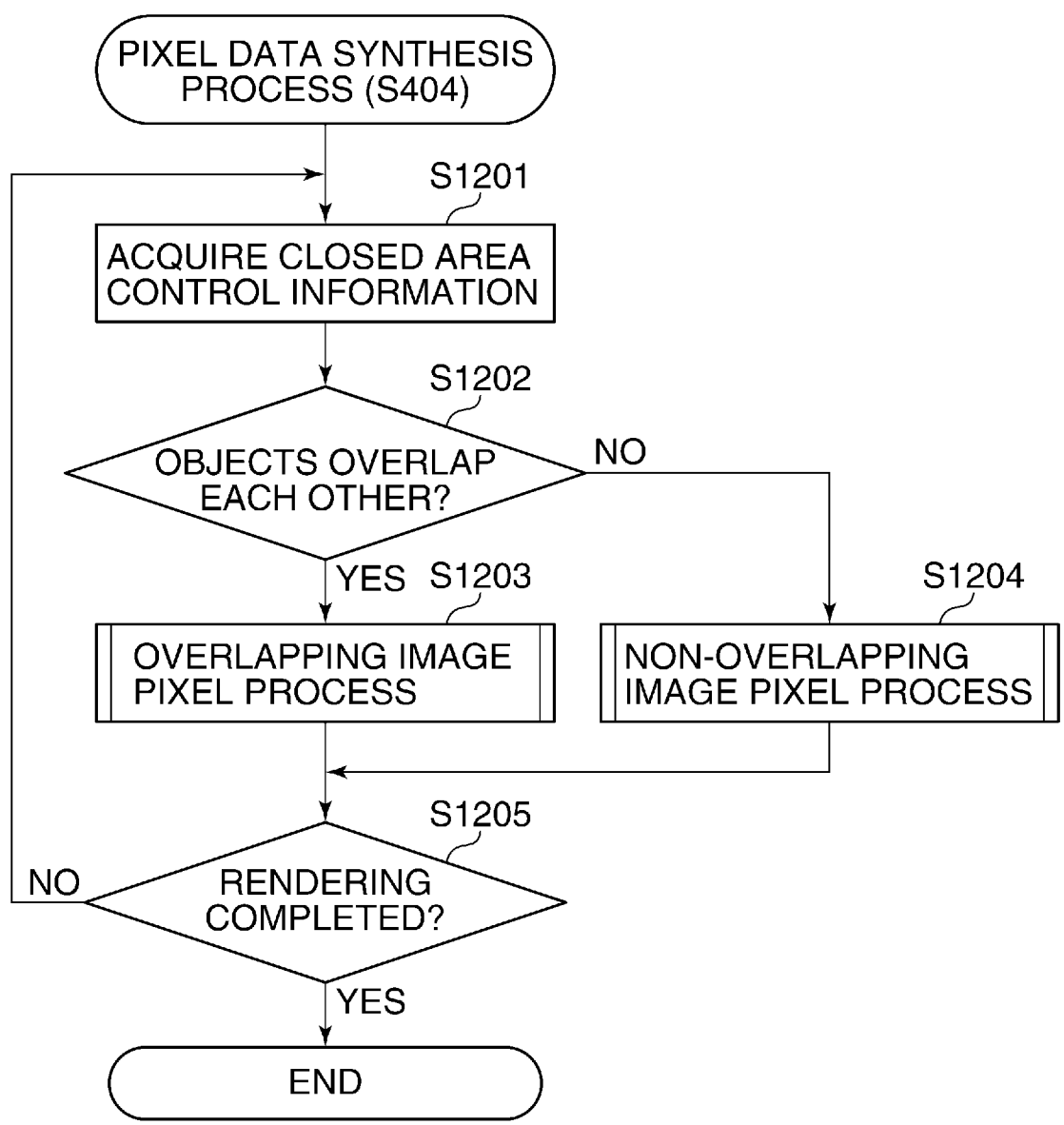
FIG. 12 is a flowchart of the pixel data synthesis process performed in the corresponding step in FIG. 4.

FIG. 12 is a flowchart of the pixel data synthesis process performed in the step S404 in FIG. 4. This process is performed by the image formation processor 302.

First, the image formation processor 302 acquires the control information of a closed area to be processed from the communication memory 321 (step S1201). The control information of the closed area refers to information including a pixel length and the number of objects, out of the closed area information shown in FIG. 6B.

Next, the image formation processor 302 determines whether or not there is an overlap of objects, based on the control information of the closed area (step S1202). This determination is performed based on the number of objects included in the control information of the closed area. More specifically, if there are two or more objects, it is determined that there is an overlap of objects (YES to the step S1202), and the image formation processor 302 proceeds to an overlapping image pixel process in a step S1203. On the other hand, if there is one object, it is determined that there is no overlap (NO to the step S1202), and the image formation processor 302 proceeds to a non-overlapping image pixel process in a step S1204.

Next, in the overlapping image pixel process in the step S1203, image formation processor 302 performs processing for synthesizing pieces of pixel data of the objects included in the closed area. This process will be described in detail hereinafter with reference to FIG. 14. On the other hand, in the non-overlapping image pixel process in the step S1204, the image formation processor 302 acquires the piece of pixel data of the object included in the closed area, and outputs the acquired piece of pixel data as a bitmap image. This process will be described in detail hereinafter with reference to FIG. 13.

After execution of the step S1203 or S1204, next, the image formation processor 302 determines whether or not the processing operations in the steps S1201 to S1204 (rendering processing) are completed for all of closed areas included in the page (step S1205). If the processing operations are not completed (NO to the step S1205), the image formation processor 302 returns to the step S1201, whereas if the processing operations are completed (YES to the step S1205), the image formation processor 302 terminates the present process.

Figure 13:
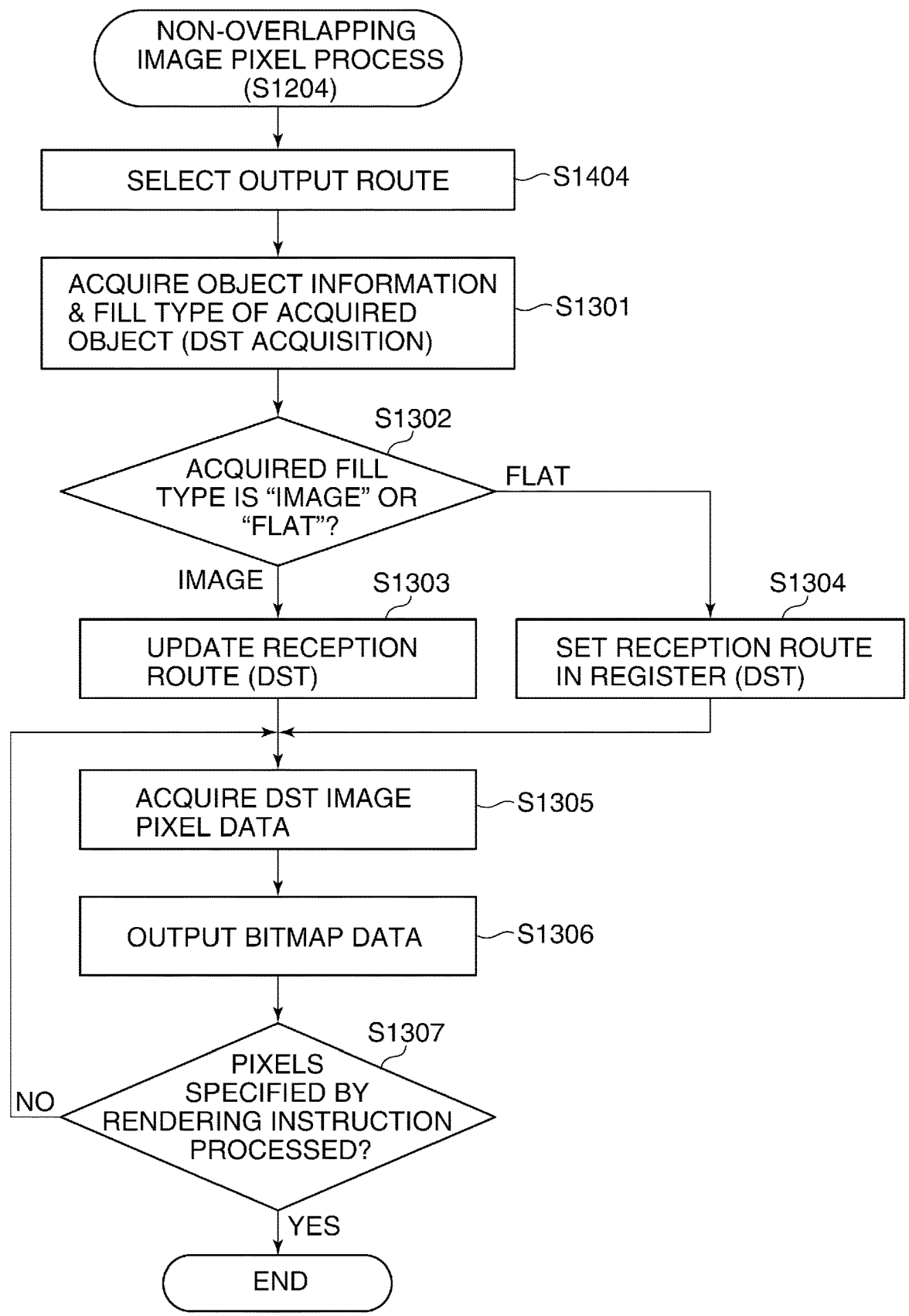
FIG. 13 is a flowchart of a non-overlapping image pixel process performed in a corresponding step in FIG. 12.

FIG. 13 is a flowchart of the non-overlapping image pixel process performed in the step S1204 in FIG. 12. This process is performed by the image formation processor 302.

First, the image formation processor 302 selects a route for outputting the piece of pixel data sent from the image formation processor 301 and having no overlap (step S1404). This process is also performed in the overlapping image pixel process, described hereinafter with reference to FIG. 14, and hence first, the image formation processor 302 determines whether or not an object to be processed is the last object included in the closed area, and the route is selected according to a result of the determination. Here, the processing is performed for the closed area having no overlap, and hence the processed object is necessarily the last object included in the closed area. In this case, the image formation processor 302 selects a route for outputting, via the communication unit 317, the pixel data received as a bitmap image. Note that processing of an object included in the closed area, which is not the last object, will be described with reference to FIG. 14.

Next, the image formation processor 302 acquires, from the object information of the closed area to be processed, dst (destination) object information, i.e. object information of a first piece of pixel data to be sent from the pixel data generation unit 212, out of pieces of pixel data to be processed. Further, the image formation processor 302 acquires the information indicating the fill type, which is included in the dst object information (step S1301). The object information of the closed area includes information indicating a fill type, a synthesis processing type, a color, an image, etc. as shown in FIG. 6B.

Next, the image formation processor 302 determines whether the information indicating the fill type, which has been acquired in the step S1301, is "image" indicative of multi-color or "flat" (graphics) indicative of a single color (step S1302). If the fill type is image, the image formation processor 302 proceeds to a step S1303, whereas if the fill type is "flat", the image formation processor 302 proceeds to a step S1304.

In the step S1303, the image formation processor 302 performs a reception route-updating process to determine a reception route for receiving piece of image pixel data sent from the image formation processor 301. In this step, the image formation processor 302 selects one of the communication memories 322 and 323a, from which pixel data is to be acquired, based on information of the acquisition source sent from the image formation processor 301 via the communication memory 321. More specifically, the image formation processor 302 sets the value of a variable next_rcv_com_route in the variable rcv_com_route_ds. Here, the variable rcv_com_route_dst indicates a communication memory from which the piece of destination image pixel data is to be sent. Further, the variable next_rcv_com_route indicates a communication memory from which the next image pixel data is to be sent. If the next image pixel data is to be sent from the communication memory 322, the variable next_rcv_com_route is set to 0, whereas if the next image pixel data is to be sent from the communication memory 323, the variable next_rcv_com_route is set to 1. As described above, the image formation processor 301 outputs a generated piece of image pixel data to the communication memory 322 first, and then outputs the following generated pieces of image pixel data alternately to the communication memory 322 and the communication memory 323. Therefore, the image formation processor 302 holds the variable next_rcv_com_route as information indicating a communication route from which the image formation processor 301 sends the next image pixel data. Then, whenever it is determined in the step S1302 that the information indicating the fill type is "image", the value set in the variable next_rcv_com_route is updated, such that each piece of image pixel data is output alternately to the communication memory 322 and the communication memory 323. Further, the updated value of the variable next_rcv_com_route is set in the variable rcv_com_route_dst. Then, flag information indicating whether or not to receive a piece of image pixel data from the communication memory set based on the value of the variable next_rcv_com_route in synthesis processing is set in route information route_control. If the image pixel data is to be received, the value of 1 is set in the route information route_control as the flag information. On the other hand, if the image pixel data is not to be received, the value of 0 is set in the route information route_control as the flag information. The route information route_control is information for controlling each communication memory and reception of pixel data from the communication memory. The 0-th bit of the route information route_control represents information indicating whether or not to receive a piece of pixel data from the communication memory 322. Further, the first bit represents information indicating whether or not to receive a piece of pixel data from the communication memory 323. Further, the second bit represents information indicating whether or not a piece of pixel data is stored in the communication memory 324. Further, the third bit represents information indicating whether or not a piece of pixel data to be used for synthesis processing is loaded in the memory. After that, the variable next_rcv_com_route is updated (step S1303). In short, as the actual variable control, the following second variable control processing is performed:

rcv_com_route_dst=next_rcv_com_route;
route_control|=(next_rcv_com_route+1)
next_rcv_com_route=(next_rcv_com_route+1) & 1;

On the other hand, in the step S1304, the image formation processor 302 sets a reception source of the color information included in the object information in a predetermined register. In this step, more specifically, a value indicating that the color information is to be acquired from the register is set in the variable rcv_com_route_dst. Then, the image formation processor 302 further sets information indicating the color of a single color, included in the dst object information, in a predetermined register (register (dst)).

Then, in a step S1305, if the information indicating the fill type, included in the object information, is "image", the image formation processor 302 performs a process for acquiring image pixel data from the communication memory which is determined to be the communication route in the step S1303. On the other hand, if the information indicating the fill type, included in the object information, is "flat", the image formation processor 302 performs a process for acquiring pixel data of single color data set in the register in the step S1304. This process will be described in detail hereinafter.

Next, the image formation processor 302 outputs the pixel data acquired in the step S1305 via the communication unit 317 as the bitmap data (step S1306). This process will be described in detail hereinafter. Next, the image formation processor 302 determines whether or not a number of pixels specified by the rendering instruction have been processed (step S1307). More specifically, the image formation processor 302 determines whether or not the processing is completed for a number of pixels corresponding to a pixel length included in closed area control information 621 appearing in FIG. 6B. If it is determined that the processing is not completed, the image formation processor 302 returns to the step S1305, whereas if it is determined that the processing is completed, the image formation processor 302 terminates the present process.

Figure 14:
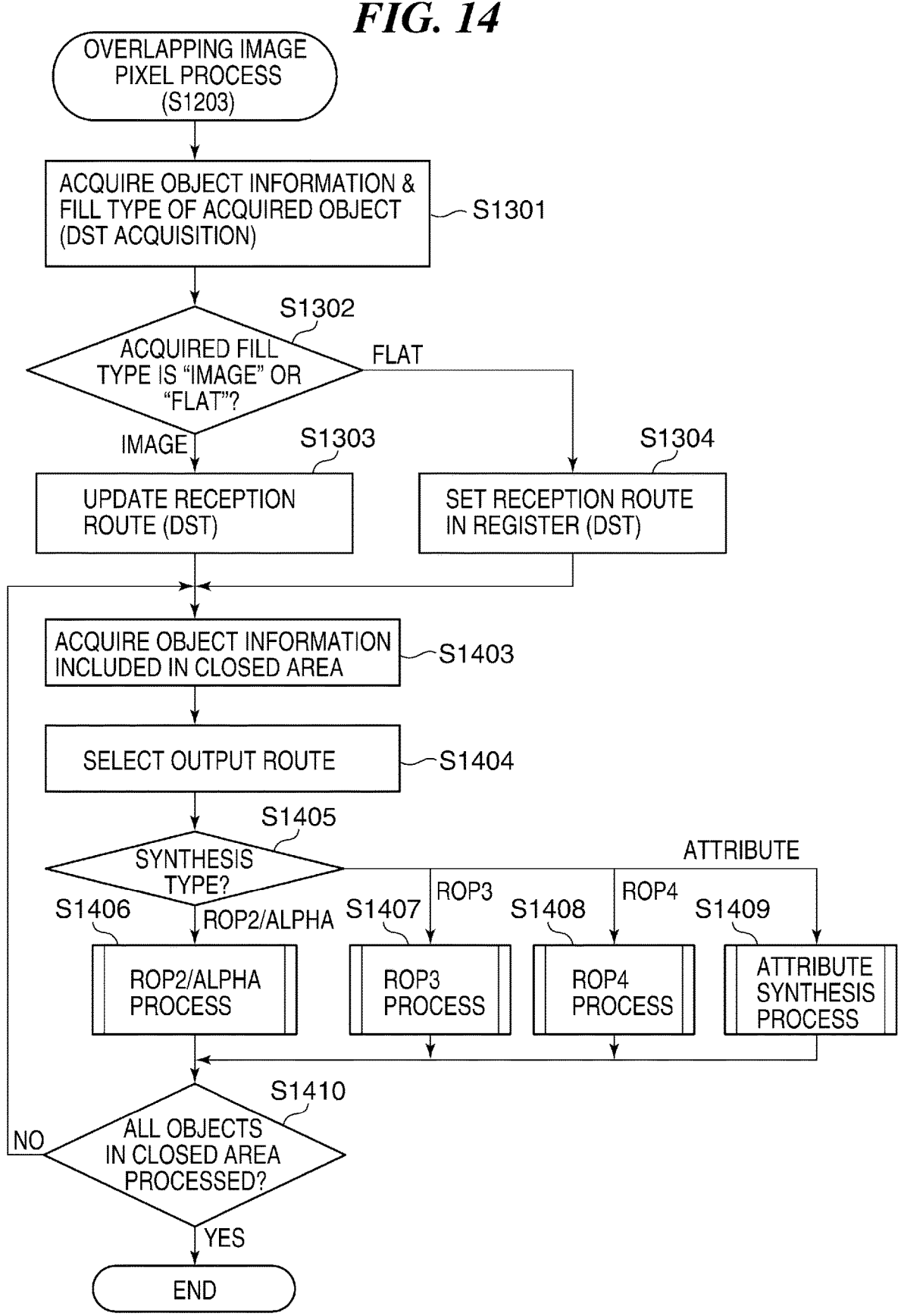
FIG. 14 is a flowchart of an overlapping image pixel process performed in a corresponding step in FIG. 12.

FIG. 14 is a flowchart of the overlapping image pixel process performed in the step S1203 in FIG. 12. This process is performed by the image formation processor 302. Note that the same processing steps as those in FIG. 13 are denoted by the same step numbers, and description thereof is omitted.

First, the image formation processor 302 acquires dst object information from the object information of the closed area to be processed, and further acquires information indicating a fill type, included in the dst object information (step S1301). Next, the image formation processor 302 determines whether the information indicating the fill type acquired in the step S1301 is "image" or "flat" (graphics) indicative of a single color (step S1302). If the fill type is "image", the image formation processor 302 proceeds to the step S1303, whereas if the fill type is "flat", the image formation processor 302 proceeds to the step S1304.

In the step S1303, the image formation processor 302 performs the reception route-updating process so as to determine a reception route to receive the piece of image pixel data sent from the image formation processor 301. This process is the same as that described with reference to FIG. 13. On the other hand, in the step S1304, the image formation processor 302 sets a reception source of the color information included in the object information in the predetermined register (step S1304). This process is the same as that described with reference to FIG. 13.

Next, the image formation processor 302 acquires the object information included in the overlapping rendering area (step S1403), and selects an output route of pixel data of the object having an overlap, which is sent from the image formation processor 301 (step S1404). As described above with reference to FIG. 13, in this process, the image formation processor 302 determines whether or not an object to be processed is the last object included in the closed area, and selects a route according to a result of the determination. If an object to be processed is the last object included in the closed area, the image formation processor 302 selects a route in which a piece of pixel data received as a bitmap image is to be output via the communication unit 317. On the other hand, if the object to be processed is not the last object included in the closed are, the image formation processor 302 selects a route in which the piece of pixel data is to be output to the communication memory 324 via the communication unit 318. This process will be described in detail hereinafter.

Next, the image formation processor 302 determines the synthesis processing type of the object information acquired in the step S1403 (step S1405). If the synthesis processing type is ROP2 or alpha, the image formation processor 302 performs a ROP2/alpha process (step S1406). Further, if the synthesis processing type is ROP3, the image formation processor 302 performs a ROP3 process (step S1407). Further, if the synthesis processing type is ROP4, the image formation processor 302 performs a ROP4 process (step S1408). Further, if the synthesis processing type is attribute, the image formation processor 302 performs an attribute synthesis process (step S1409). These processes will be described in detail hereinafter.

Next, the image formation processor 302 determines whether or not the processing is completed for all objects included in the closed area (step S1410). The completion determination in this step is performed based on whether or not objects corresponding in number to the value indicated by the number of objects included in the control information of the closed area have been processed. If it is determined that the processing is not completed, the image formation processor 302 returns to the step S1403, whereas if it is determined that the processing is completed, the image formation processor 302 terminates the present process.

Figure 15:
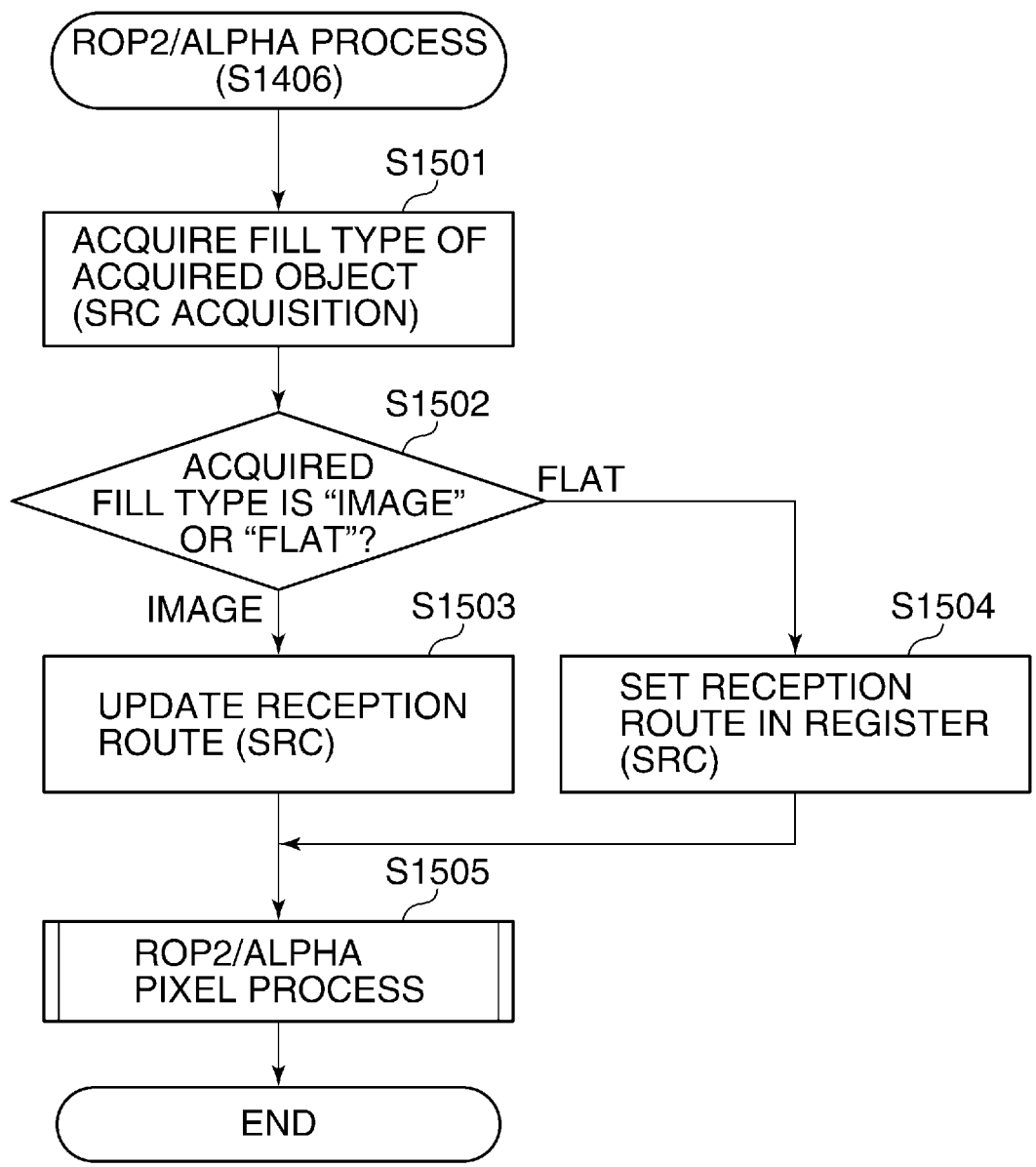
FIG. 15 is a flowchart of a ROP2/alpha process performed in a corresponding step in FIG. 14.

FIG. 15 is a flowchart of the ROP2/alpha process performed in the step S1406 in FIG. 14. This process is performed by the image formation processor 302.

First, the image formation processor 302 acquires src object information from the object information of the closed area to be processed, i.e. the object information of a second piece of pixel data to be sent from the pixel data generation unit 212, out of the pieces of pixel data to be processed. Further, the image formation processor 302 acquires the information indicating a fill type included in the src object information (step S1501), and determines whether the acquired information indicating the fill type is "image" or "flat" (graphics) indicative of a single color (step S1502). If the fill type is "image", the image formation processor 302 proceeds to a step S1503, whereas if the fill type is "flat", the image formation processor 302 proceeds to a step S1504.

In the step S1503, the image formation processor 302 performs the reception route-updating process so as to determine a reception route so as to receive the piece of image pixel data sent from the image formation processor 301. In this step, the image formation processor 302 selects one of the communication memories 322 and 323 from which the pixel data is to be acquired, based on information of the acquisition source sent from the image formation processor 301 via the communication memory 321. More specifically, the value of the variable next_rcv_com_route is set in the variable rcv_com_route_src sent from the image formation processor 301. Here, the variable rcv_com_route_src indicates a communication memory from which the piece of source image pixel data is to be sent. Further, the variable next_rcv_com_route indicates a communication memory from which the next image pixel data is to be sent. If the next image pixel data is to be sent from the communication memory 322, the variable next_rcv_com_route is set to 0, whereas if the next image pixel data is to be sent from the communication memory 323, the variable next_rcv_com_route is set to 1. As described above, the image formation processor 301 outputs the generated image pixel data to the communication memory 322 first, and then outputs the subsequent image pixel data alternately to the communication memory 322 and the communication memory 323. Therefore, the image formation processor 302 holds the variable next_rcv_com_route as the information indicating the communication route from which the image formation processor 301 is to send the next image pixel data. Then, whenever it is determined in the step S1502 that the information indicating the fill type is "image", the value set to the variable next_rcv_com_route is updated such that each piece of image pixel data is to be output alternately to the communication memory 322 and the communication memory 323. Further, the updated value of the variable next_rcv_com_route is set in the variable rcv_com_ route_src. Then, flag information indicating whether or not to receive an image pixel data from a communication memory set based on the variable next_rcv_com_route in synthesis processing is set in the route information route_control. The route information route_control has been described hereinabove. After that, the variable next_rcv_com_route is updated. In short, as the actual variable control, the following third variable control processing is performed:

rcv_com_route_src=next_rcv_com_route;
route_control|=(next_rcv_com_route+1)
next_rcv_com_route=(next_rcv_com_route+1) & 1;

On the other hand, in the step S1504, the image formation processor 302 sets a reception source of the color information included in the object information in the predetermined register. In this step, more specifically, a value indicating that the color information is to be acquired from the register is set in the variable rcv_com_route_src. Then, the image formation processor 302 further sets information indicating the color of the single color, included in the src (source) object information, in the predetermined register (register (src)).

Then, in a step S1505, the image formation processor 302 performs the ROP2/alpha pixel process, followed by terminating the present process. In the step S1505, the image formation processor 302 acquires the pixel data from the route set in one of the steps S1503 and S1504, and performs the ROP2/alpha pixel process on the acquired pieces of pixel data. This process will be described in detail hereinafter.

Figure 16:
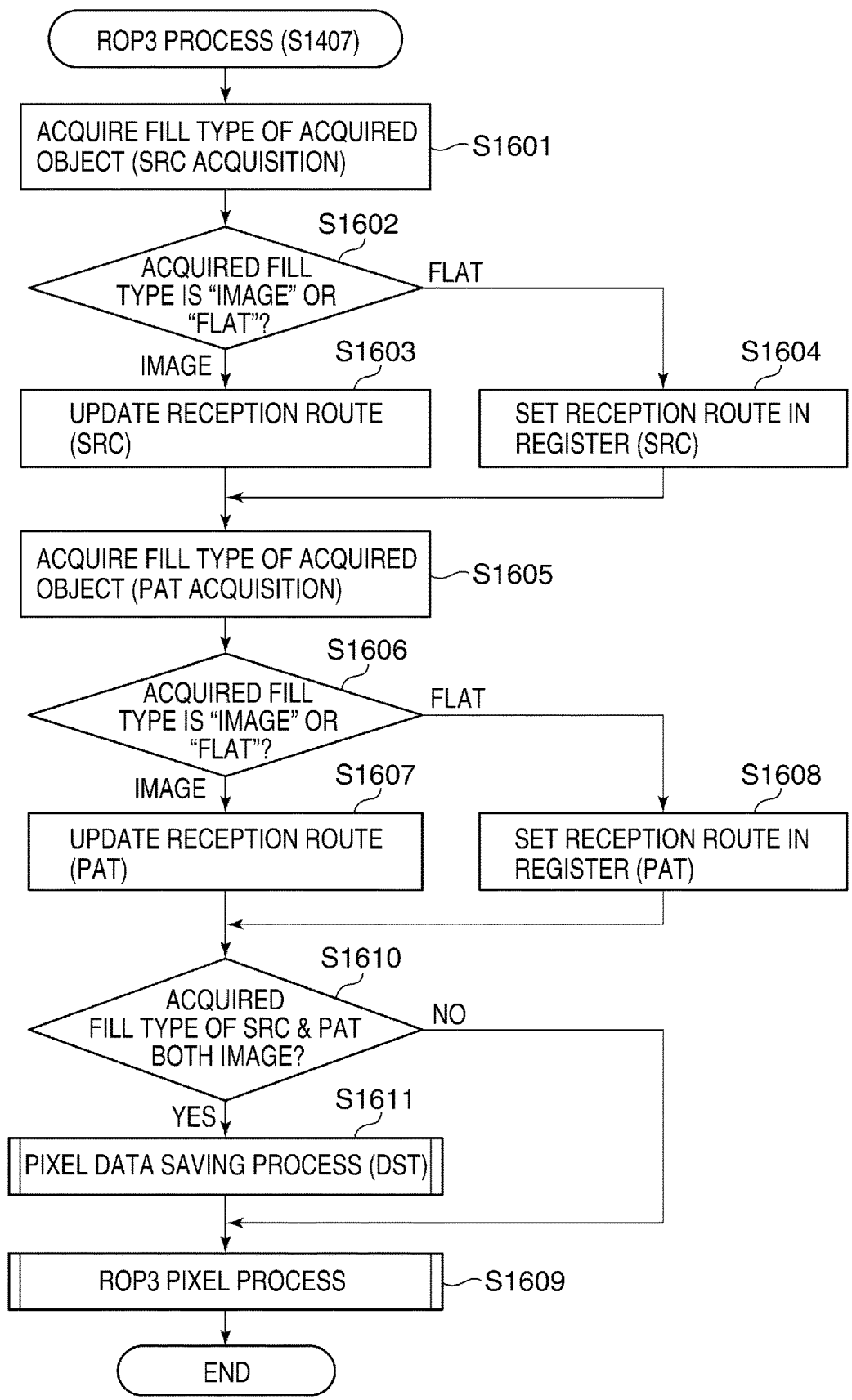
FIG. 16 is a flowchart of a ROP3 process performed in a corresponding step in FIG. 14.

FIG. 16 is a flowchart of the ROP3 process performed in the step S1407 in FIG. 14. This process is performed by the image formation processor 302.

First, the image formation processor 302 acquires the src object information from the object information of the closed area to be processed, and further acquires the information indicating the fill type, included in the src object information (step S1601). Then, the image formation processor 302 determines whether the acquired information indicating a fill type is "image" or "flat" (graphics) indicative of a single color (step S1602). If the fill type is "image", the image formation processor 302 proceeds to a step S1603, whereas if the fill type is "flat", the image formation processor 302 proceeds to a step S1604.

In the step S1603, the image formation processor 302 performs the reception route-updating process so as to determine a reception route to receive the piece of image pixel data sent from the image formation processor 301 (step S1603). In this step, the image formation processor 302 selects a communication memory to acquire the piece of pixel data, based on information of the acquisition source sent from the image formation processor 301 via the communication memory 321. This process is the same as that performed in the step S1503, and hence description thereof is omitted.

On the other hand, in the step S1604, the image formation processor 302 sets a reception source of the color information included in the object information to the predetermined register (step S1604). In this step, more specifically, a value indicating that the color information is to be acquired from the register is set in the variable rcv_com_route_src. Then, the image formation processor 302 further sets information indicating the color of a single color, included in the src object information, in the predetermined register (register (src)).

Next, the image formation processor 302 acquires pat (pattern) object information from the object information of the closed area to be processed, i.e. the object information of a third piece of pixel data to be sent from the pixel data generation unit 212, out of the pieces of pixel data to be processed. Further, the image formation processor 302 acquires information indicating a fill type included in the pat object information (step S1605), and determines whether the acquired information indicating the fill type is "image" or "flat" (graphics) indicative of a single color (step S1606). If the fill type is "image", the image formation processor 302 performs the reception route-updating process so as to determine a reception route to receive the piece of image pixel data sent from the image formation processor 301 (step S1607). In this step, the image formation processor 302 selects a communication memory to acquire the piece of pixel data, based on information of the acquisition source sent from the image formation processor 301 via the communication memory 321. More specifically, the image formation processor 302 sets the value of the variable next_rcv_com_route indicative of a communication memory from which the next image pixel data is to be sent in a variable rcv_com_route_pat indicative of a communication memory from which a piece of pat image pixel data is to be sent, and is assumed here to have the same value as the value of the variable rcv_com_route_src set therein. Then, flag information indicating that the piece of image pixel data is to be received from the communication memory set in the variable rcv_com_route_pat, in synthesis processing, is set in the route information route_control. The route information route_control is described hereinabove. After that, the variable next_rcv_com_route is updated. In short, as the actual variable control, the following fourth variable control processing is performed:

rcv_com_route_pat=next_rcv_com_route;
route_control|=(next_rcv_com_route+1)
next_rcv_com_route=(next_rcv_com_route+1) & 1;

On the other hand, if it is determined in the step S1606 that the fill type is "flat", the image formation processor 302 sets a reception source of the color information included in the object information in the predetermined register (step S1608). In this step, more specifically, a value indicating that the color information is to be acquired from the register is set in the aforementioned variable rcv_com_route_pat. Then, the image formation processor 302 further sets information indicating the color of a single color, included in the pat object information, in the predetermined register (register (pat)).

Next, the image formation processor 302 determines whether or not the information items each indicative of the fill type of the src/pat object information, determined in the steps S1602 and S1606, both indicate "image" (step S1610). This determination is performed to determine whether or not it is necessary to temporarily save the piece of dst pixel data in the communication memory 324 so as to perform ROP3 processing. If both the information items each indicative of the fill type indicate "image", the image formation processor 302 proceeds to a step S1611, wherein the piece of dst pixel data is saved, and then image formation processor 302 proceeds to a step 1609, whereas if not, the image formation processor 302 proceeds directly to the step S1609.

In the step S1609, the image formation processor 302 performs a ROP3 pixel process, followed by terminating the present process. In the step S1609, the image formation processor 302 acquires the pieces of pixel data from the routes set in the respective steps S1603, S1604, S1607, S1608, and S1611, and performs the ROP3 pixel process for the acquired pieces of pixel data. This process will be described in detail hereinafter.

Figure 17:
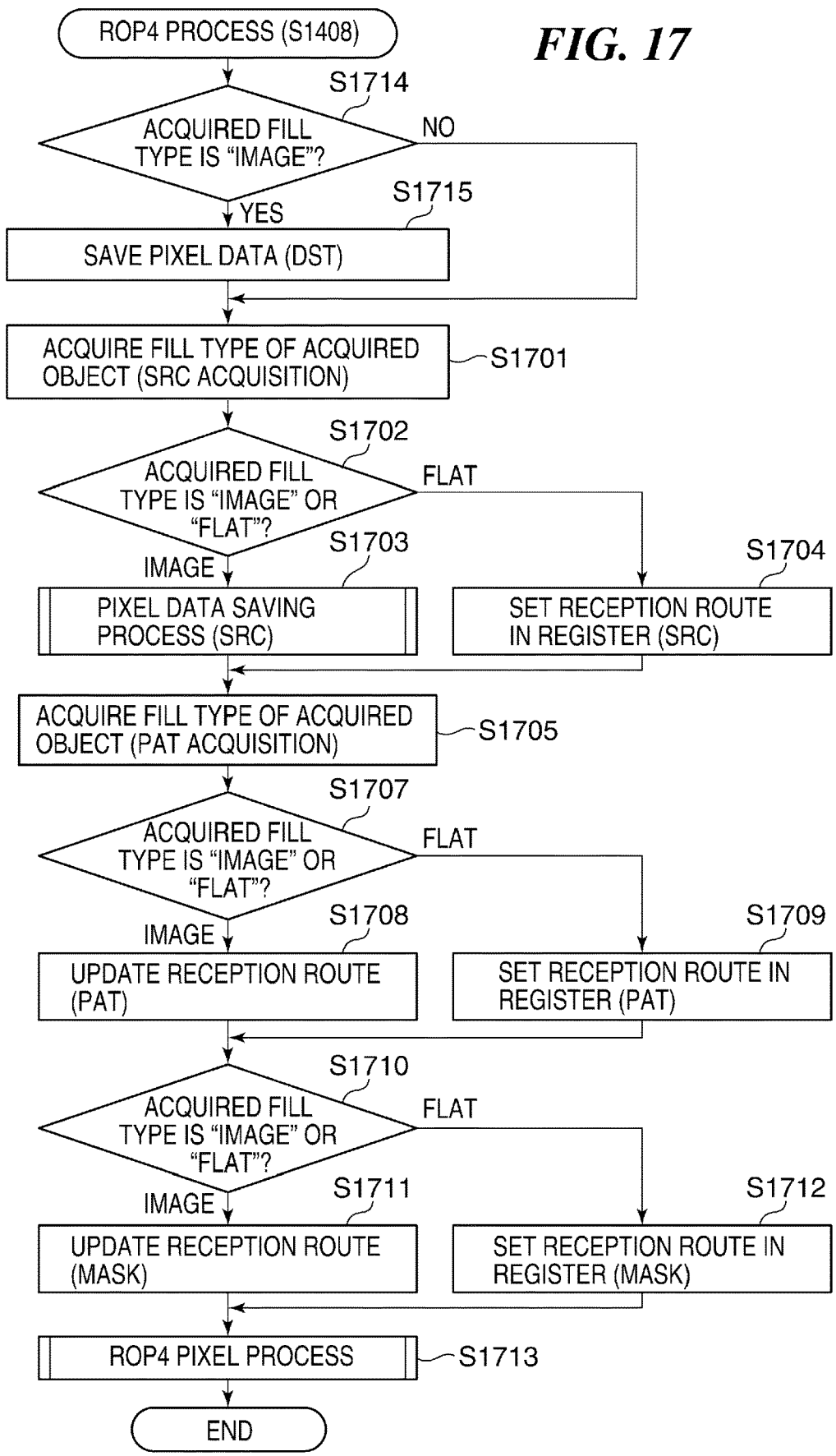
FIG. 17 is a flowchart of a ROP4 process performed in a corresponding step in FIG. 14.

FIG. 17 is a flowchart of the ROP4 process performed in the step S1408 in FIG. 14. This process is performed by the image formation processor 302.

First, the image formation processor 302 determines whether or not the information indicating a fill type included in the dst object information acquired in the step S1301 is "image" (step S1714). This determination is performed to determine whether or not it is necessary to temporarily save the piece of dst pixel data in the communication memory 324 to perform ROP4 processing. If it is determined in the step S1714 that the fill type is "image", the image formation processor 302 proceeds to a step S1715, wherein the piece of dst pixel data is saved, and then the image formation processor 302 proceeds to a step S1701, whereas if not, the image formation processor 302 proceeds directly to the step S1701. In the step S1701, the image formation processor 302 acquires the src object information from the object information of the closed area to be processed, and further acquires the information indicating a fill type, which is included in the src object information.

Next, the image formation processor 302 determines whether the information indicating the fill type, acquired in the step S1301, is "image" or "flat" (graphics) indicative of a single color (step S1702). If the fill type is "image", the image formation processor 302 proceeds to a step S1703, whereas if the fill type is "flat", the image formation processor 302 proceeds to a step S1704. In the step S1703, the image formation processor 302 saves the piece of image pixel data sent from the image formation processor 301 into the memory (step S1703). This process will be described in detail hereinafter. On the other hand, in the step S1704, the image formation processor 302 sets a reception source of the color information, which is included in the object information, in the predetermined register (step S1704). In this step, more specifically, the image formation processor 302 sets a value indicating that the color information is to be acquired from the register, in the above-mentioned variable rcv_com_route_src. The image formation processor 302 further sets information indicating the color of a single color of the source (source) in the predetermined register (register (src)).

Next, the image formation processor 302 acquires the pat object information from the object information of the closed area to be processed, and further acquires the information indicating the fill type included in the pat object information (step S1705). Next, the image formation processor 302 determines whether the acquired information indicating the fill type is "image" or "flat" (graphics) indicative of a single color (step S1707). If the fill type is "image", the image formation processor 302 performs the reception route-updating process so as to determine a reception route to receive the piece of pat image pixel data sent from the image formation processor 301 (step S1708). In this step, the image formation processor 302 selects a communication memory to acquire the piece of pixel data based on the information of the acquisition source, sent from the image formation processor 301 via the communication memory 321. In this step, the same processing as in the step S1607 is performed.

On the other hand, if it is determined in the step S1707 that the fill type is "flat", the image formation processor 302 sets a reception source of the color information included in the pat object information in the predetermined register (step S1709). In this step, more specifically, a value indicating that the color information is to be acquired from the register is set in the above-mentioned variable rcv_com_route_pat. Then, the image formation processor 302 further sets information indicative of the color of the single color of a pattern, included in the pat object information, in the predetermined register (register (pat)).

Next, the image formation processor 302 acquires mask object information from the object information of the closed area to be processed, and further determines whether the information indicating a fill type, which is included in the mask object information, is "image" or "flat" (graphics) indicative of a single color (step S1710). If the fill type is "image", the image formation processor 302 performs the reception route-updating process so as to determine a reception route to receive the piece of mask image pixel data sent from the image formation processor 301 (step S1711). In this step, the image formation processor 302 selects a communication memory to acquire the piece of pixel data based on the information of the acquisition source sent from the image formation processor 301 via the communication memory 321. More specifically, the value of the variable next_rcv_com_route is set in the variable rcv_com_route_mask sent from the image formation processor 301. Here, the variable rcv_com_route_mask indicates a communication memory from which a piece of mask image pixel data is to be sent. Further, the variable next_rcv_com_route indicates a communication memory from which the next image pixel data is to be sent, and is assumed here to have the same value as the value of the variable rcv_com_route_src set therein. Then, flag information indicating that the piece of image pixel data is to be received from the communication memory set in the variable rcv_com_route_mask in synthesis processing is set in the route information route_control. The route information route_control has been described hereinabove. After that, the variable next_rcv_com_route is updated. In short, as the actual variable control, the following fifth variable control processing is performed:

rcv_com_route_mask=next_rcv_com_route;
route_control|=(next_rcv_com_route+1)
next_rcv_com_route=(next_rcv_com_route+1) & 1;

On the other hand, if it is determined in the step S1710 that the fill type is "flat", the image formation processor 302 sets a reception source of the color information included in the mask object information in the predetermined register (step S1712). In this step, more specifically, a value indicating that the color information is to be acquired from the register is set in the above-mentioned variable rcv_com_route_mask. Then, the image formation processor 302 further sets information indicating the color of a single color of a mask in the predetermined register (register (mask)).

After execution of the step S1711 or S1712, next, the image formation processor 302 performs a ROP4 pixel process (step S1713), followed by terminating the present process. In the step S1713, the image formation processor 302 acquires the pieces of pixel data from the routes set in the steps S1715, S1703, S1704, S1708, S1709, S1711 and S1712, and performs the ROP4 pixel process for the acquired pieces of pixel data. This process will be described in detail hereinafter.

Figure 18:
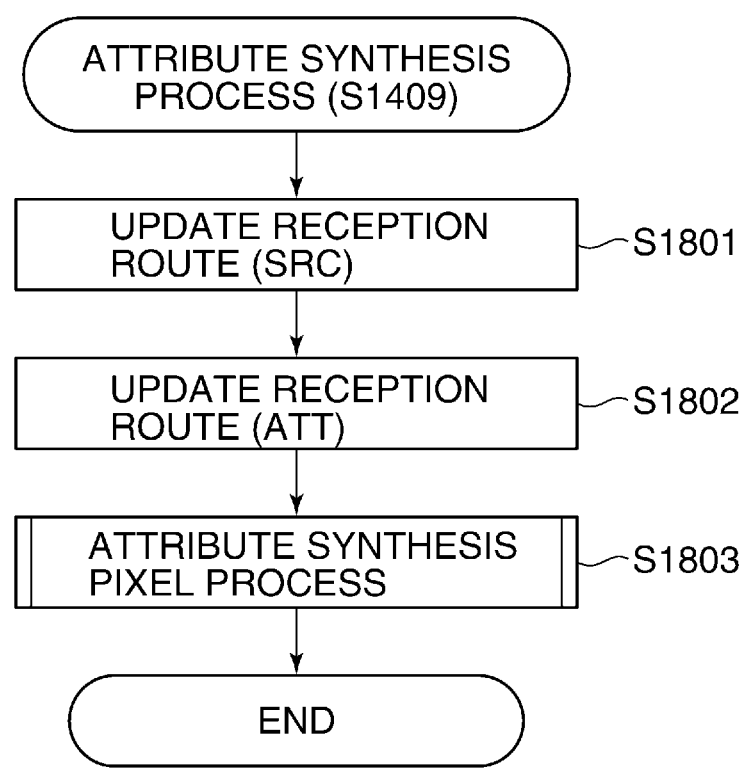
FIG. 18 is a flowchart of an attribute synthesis process performed in a corresponding step in FIG. 14.

FIG. 18 is a flowchart of the attribute synthesis process performed in the step S1409 in FIG. 14. This process is performed by the image formation processor 302.

First, the image formation processor 302 performs the reception route-updating process so as to determine a reception route to receive the piece of src image pixel data sent from the image formation processor 301 (step S1801). In this step, the image formation processor 302 selects a communication memory to acquire the piece of pixel data based on information of the acquisition source sent from the image formation processor 301 via the communication memory 321. More specifically, the same processing as in the step S1503 is performed.

Next, the image formation processor 302 performs the reception route-updating process so as to determine a reception route to receive the piece of attribute image pixel data (step S1802). In this step, the image formation processor 302 selects a communication memory to acquire the piece of pixel data based on information of the acquisition source sent from the image formation processor 301 via the communication memory 321. More specifically, the value of the variable next_rcv_com_route is set in the variable rcv_com_route_attr. Here, the variable rcv_com_route_attr indicates a communication memory from which the piece of attribute image pixel data is to be sent. Further, the variable next_rcv_com_route indicates a communication memory from which the next piece of image pixel data is to be sent, and is assumed here to have the same value as the value of the variable rcv_com_route_src set therein. Then, flag information indicating that the image pixel data is to be received from the communication memory set in the variable rcv_com_route_mask in synthesis processing is set in the route information route_control. The route information route_control has been described hereinabove. After that, the variable next_rcv_com_route is updated. In short, as the actual variable control, the following sixth variable control processing is performed:

rcv_com_route_attr=next_rcv_com_route;
route_control|=(next_rcv_com_route+1)
next_rcv_com_route=(next_rcv_com_route+1) & 1;

Finally, the image formation processor 302 performs an attribute synthesis pixel process (step S1803). In this step, the image formation processor 302 acquires the pieces of pixel data according to the routes set in the reception route-updating process performed in the steps S1801 and S1802, respectively, and performs the attribute synthesis pixel process on the acquired pieces of pixel data. This process will be described in detail hereinafter.

Figure 19:
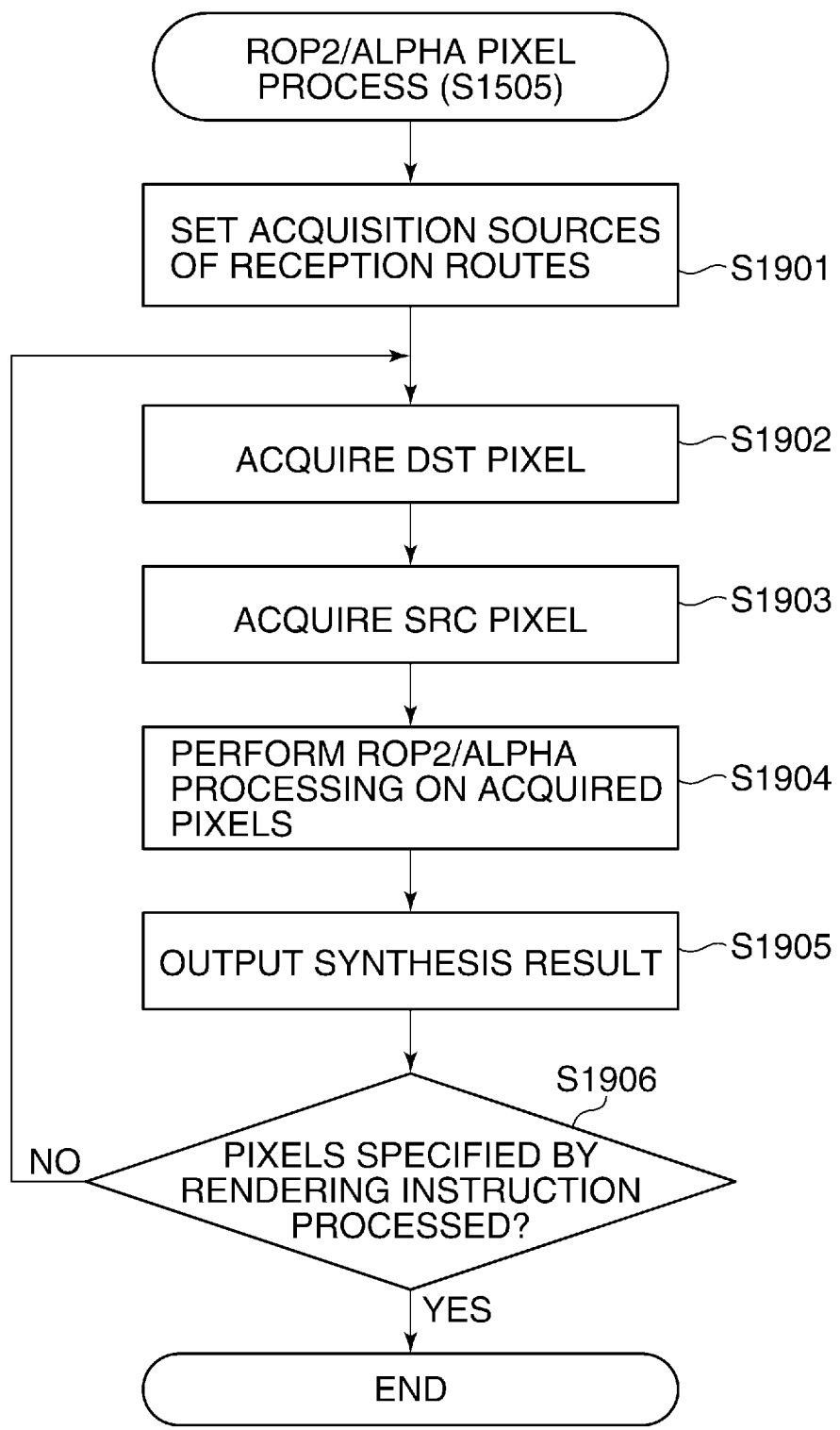
FIG. 19 is a flowchart of a ROP2/alpha pixel process performed in a corresponding step in FIG. 15.

FIG. 19 is a flowchart of the ROP2/alpha pixel process performed in the step S1505 in FIG. 15. This process is performed by the image formation processor 302.

First, the image formation processor 302 performs a process for setting acquisition sources of pieces of pixel data, which are the reception routes, respectively, based on information indicating from where to acquire the pixel data necessary for ROP2/alpha processing (step S1901). In this step, more specifically, a data control signal is output based on each value of the route information route_control, set in the step S1503 in FIG. 15, so as to control acquisition of data from each communication memory. More specifically, the com_route_0_kill signal as the data control signal is output for the communication memory 322. Further, the com_route_1_kill signal as the data control signal is output for the communication memory 323. Further, a com_route_2_kill signal as the data control signal is output for the communication memory 324. Further, the image formation processor 302 controls a signal for controlling the output of data to the memory.

Next, the image formation processor 302 acquires the piece of dst pixel data from the pixel data reception route set in the step S1303 or S1304 (step S1902). If the value of the above-mentioned variable rcv_com_route_dst is 0, the image formation processor 302 acquires a piece of pixel data from the communication memory 322. Further, if the value of the variable rcv_com_route_dst is 1, the image formation processor 302 acquires a piece of pixel data from the communication memory 323. Further, if the value of the variable rcv_com_route_dst is 2, the image formation processor 302 acquires a piece of pixel data from the communication memory 324. Further, if the value of the variable rcv_com_route_dst is a value indicating that a piece of pixel data is to be acquired from the register, the image formation processor 302 acquires the piece of pixel data from the register (dst).

Figure 23:
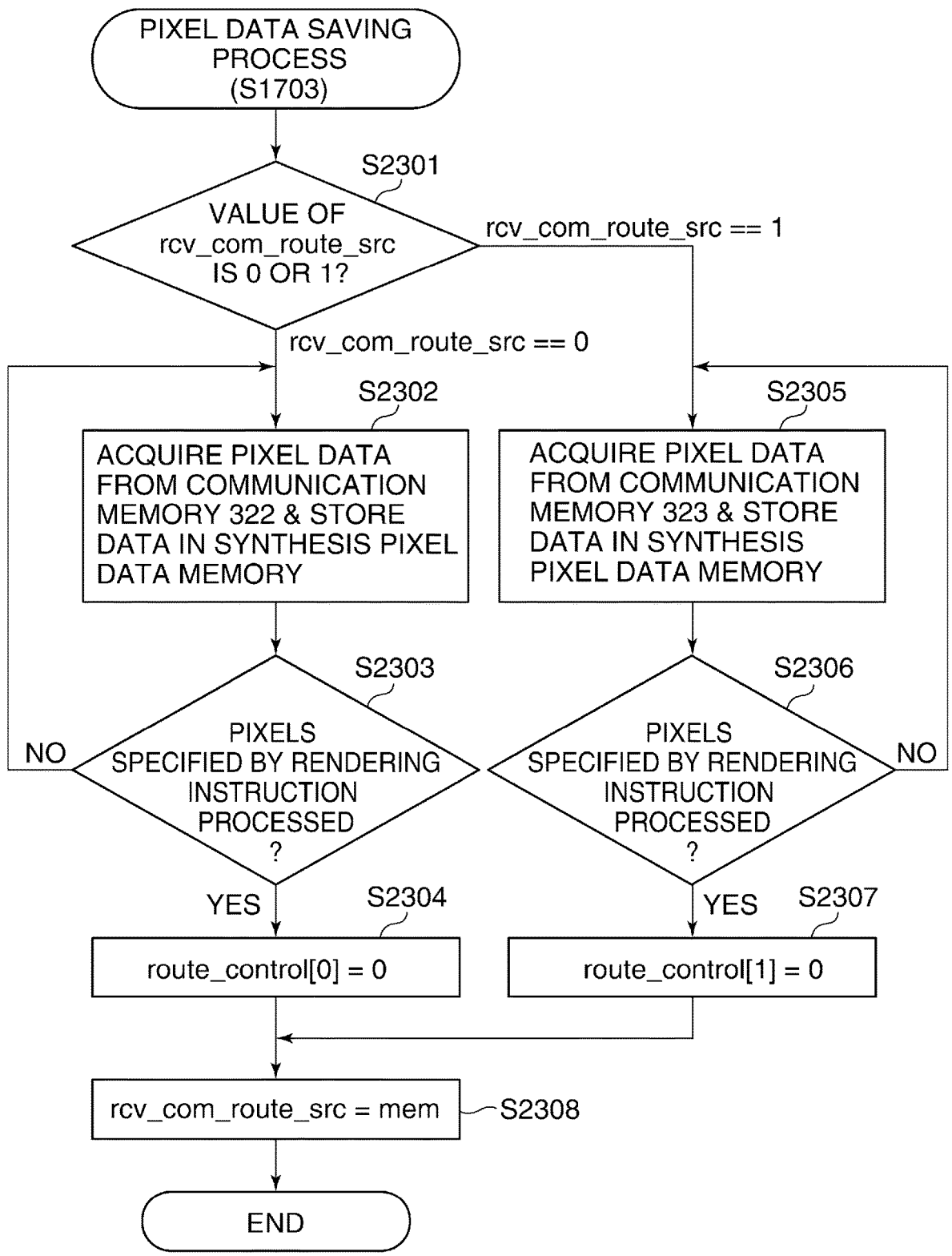
FIG. 23 is a flowchart of a pixel data saving process (src) performed in a corresponding step in FIG. 17.

Next, the image formation processor 302 acquires a piece of src pixel data from the pixel data reception route set in the step S1503 or S1504 (step S1903). If the value of the above-mentioned variable rcv_com_route_src is 0, the image formation processor 302 acquires a piece of pixel data from the communication memory 322. Further, if the value of the variable rcv_com_route_src is 1, the image formation processor 302 acquires a piece of pixel data from the communication memory 323. Further, if the value of the variable rcv_com_route_src is a value indicating that a piece of pixel data is to be acquired from the register, the image formation processor 302 acquires the piece of pixel data from the register (src). Note that there is a case where when not the ROP2/alpha pixel process, but a pixel data saving process (src), shown in FIG. 23, is performed, the value of the variable rcv_com_route_src is mem. In this case, the piece of pixel data has been loaded in the memory, and hence the image formation processor 302 acquires the piece of pixel data from the synthesis pixel data memory 330M.

Next, the image formation processor 302 performs predetermined ROP2/alpha processing using the piece of dst pixel data and the piece of src pixel data acquired in the steps S1902 and S1903 (step S1904). After that, the image formation processor 302 outputs the resulting piece of pixel data formed by the ROP2/alpha processing to the output route selected in the step S1404 (step S1905).

Next, the image formation processor 302 determines whether or not a number of pieces of pixel data specified by the rendering instruction have been processed (step S1906), and if the specified number of pieces of pixel data have not been processed, the image formation processor 302 returns to the step S1902, whereas if the specified number of pieces of pixel data have been processed, the image formation processor 302 terminates the present process.

Figure 20:
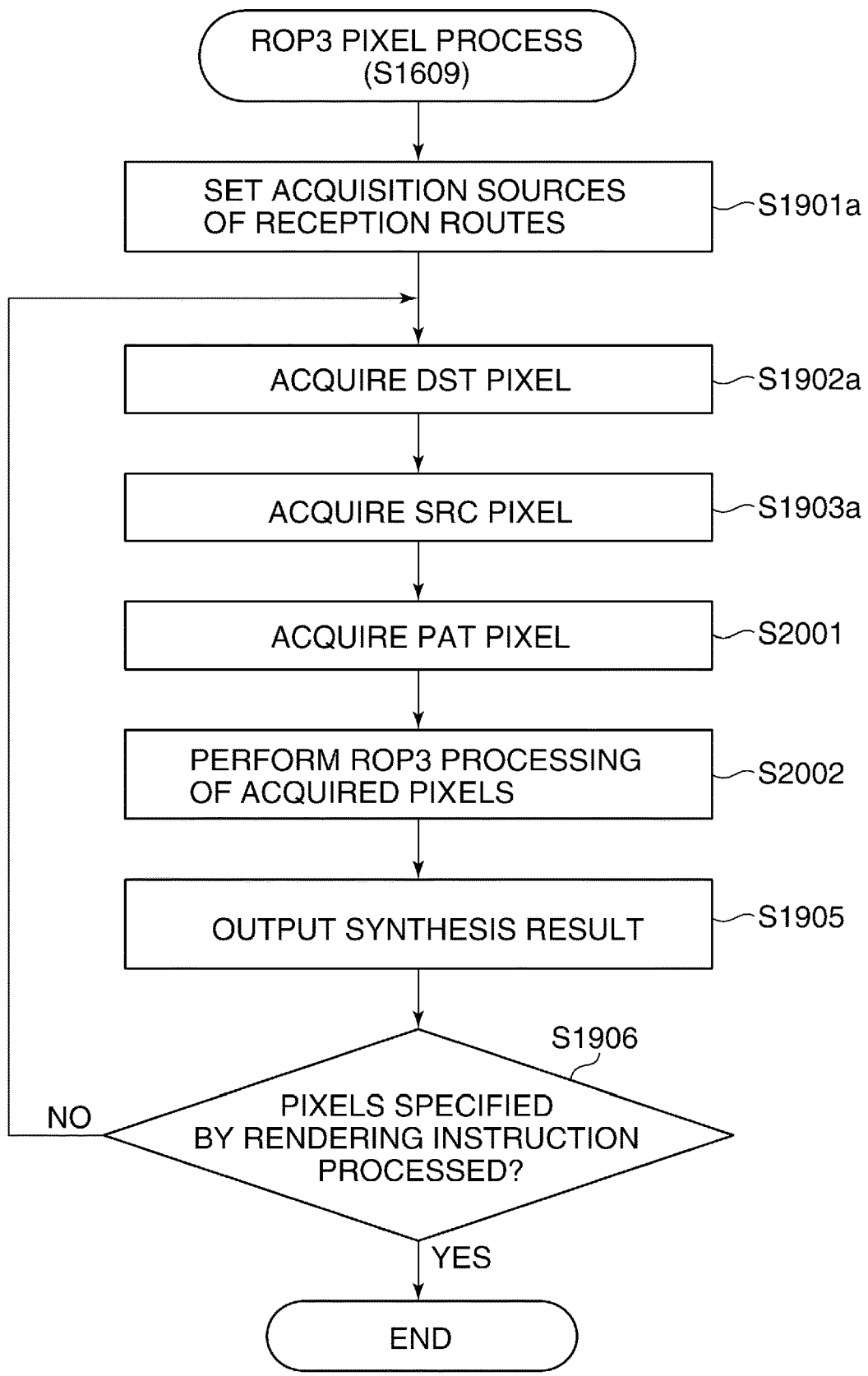
FIG. 20 is a flowchart of a ROP3 pixel process performed in a corresponding step in FIG. 16.

FIG. 20 is a flowchart of the ROP3 pixel process performed in the step S1609 in FIG. 16. This process is performed by the image formation processor 302.

First, the image formation processor 302 performs a process for setting acquisition sources of pieces of pixel data, which are the reception routes, respectively, based on information indicating from where to acquire the pieces of pixel data necessary for ROP3 processing (step S1901a). In this step, the image formation processor 302 performs the same processing as in the step S1901 in FIG. 19 based on the values of the route information route_control set in the step S1603 in FIG. 16 by performing the same processing as in the step S1503.

Next, the image formation processor 302 acquires the piece of dst pixel data from the pixel data reception route set in the step S1303, S1304, or S1611 (step S1902a). Then, the image formation processor 302 acquires the piece of src pixel data from the pixel data reception route set in the step S1603 or S1604 (step S1903a). In the steps S1902a and S1903a, the image formation processor 302 performs the same processing as in the steps S1902 and S1903 in FIG. 19, respectively.

Then, the image formation processor 302 acquires the piece of pat pixel data from the pixel data reception route set in the step S1607 or S1608 (step S2001). More specifically, if the value of the above-mentioned variable rcv_com_ route_pat is 0, the image formation processor 302 acquires a piece of pixel data from the communication memory 322. Further, if the value of the rcv_com_route_pat is 1, the image formation processor 302 acquires a piece of pixel data from the communication memory 323. Further, if the value of the rcv_com_route_pat is a value indicating that a piece of pixel data is to be acquired from the register, the image formation processor 302 acquires the piece of pixel data from the register (pat).

Next, the image formation processor 302 performs the predetermined ROP3 processing using the piece of dst pixel data, the piece of src pixel data, and the piece of pat pixel data, which are acquired in the steps S1902a, S1903a, and S2001 (step S2002). After that, the image formation processor 302 outputs the resulting piece of pixel data formed by the ROP3 processing to the output route selected in the step S1404 (step S1905).

Next, the image formation processor 302 determines whether or not a number of pixels specified by the rendering instruction have been processed (step S1906), and if the specified number of pixels have not been processed, the image formation processor 302 returns to the step S1902a, whereas if the specified number of pixels have been processed, the image formation processor 302 terminates the present process.

Figure 21:
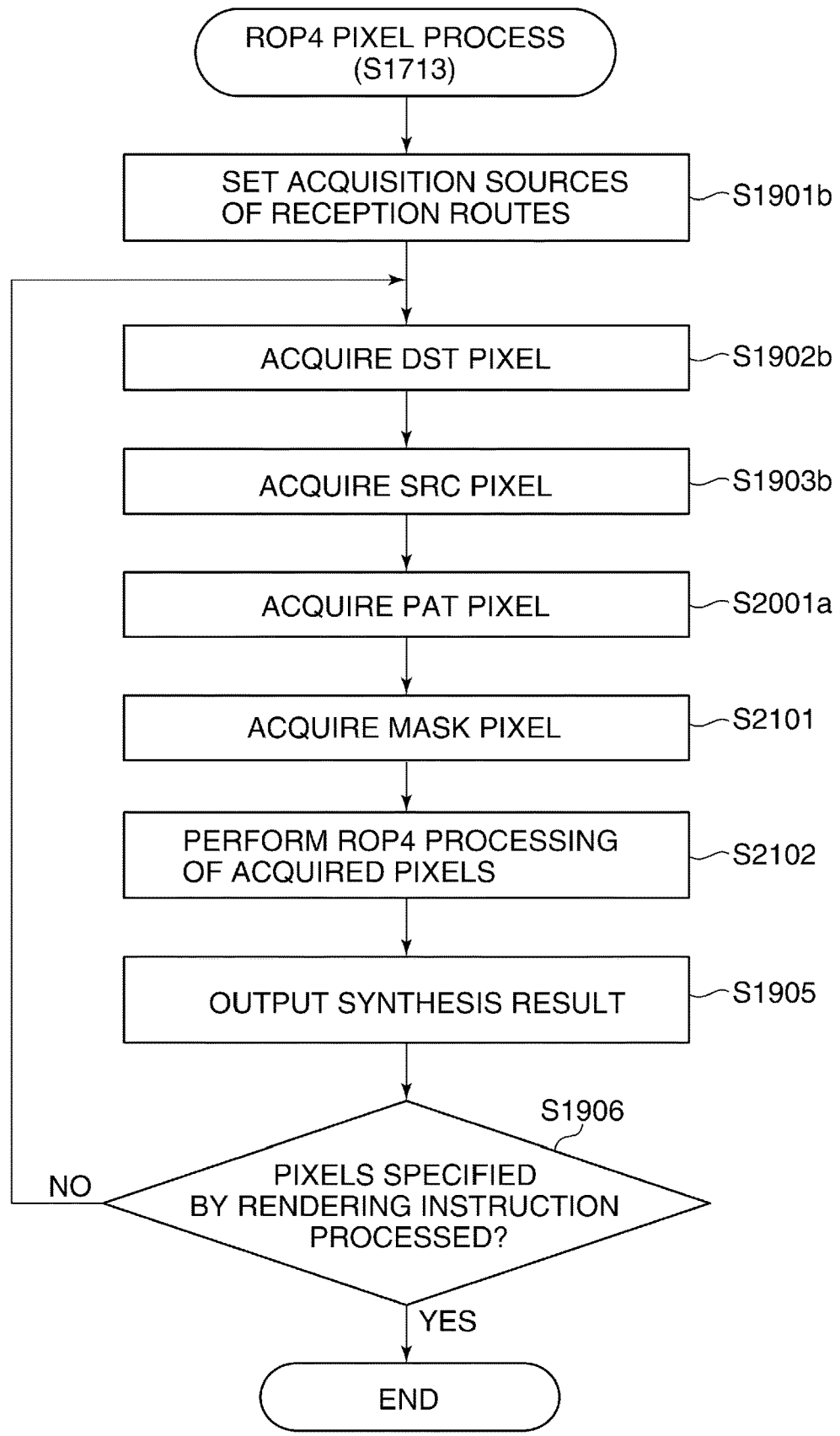
FIG. 21 is a flowchart of a ROP4 pixel process performed in a corresponding step in FIG. 17.

FIG. 21 is a flowchart of the ROP4 pixel process performed in the step S1713 in FIG. 17. This process is performed by the image formation processor 302.

First, the image formation processor 302 performs a process for setting acquisition sources of pieces of pixel data, which are the reception routes, respectively, based on information indicating from where to acquire the pieces of pixel data necessary for ROP4 processing (step S1901b). In this step, the image formation processor 302 performs the same processing as in the step S1901 in FIG. 19, based on the values of the route information route_control set by processing in the step S1715 in FIG. 17, i.e. a process described hereinafter with reference to FIG. 23.

Next, the image formation processor 302 acquires the piece of dst pixel data from the pixel data reception route set in the step S1303, S1304, or S1715 (step S1902b). Then, the image formation processor 302 acquires the piece of src pixel data from the pixel data reception route set in the step S1703 or S1704 (step S1903b). In the steps S1902b and S1903b, the image formation processor 302 performs the same processing as in the steps S1902 and S1903 in FIG. 19, respectively. Further, the image formation processor 302 acquires the piece of pat pixel data from the pixel data reception route set in the step S1708 or S1709 (step S2001a). In the step S2001a, the image formation processor 302 performs the same processing as in the step S2001 in FIG. 20.

Then, the image formation processor 302 acquires the piece of mask pixel data from the pixel data reception route set in the step S1711 or S1712 (step S2101). More specifically, if the value of the above-mentioned variable rcv_com_route_mask is 0, the image formation processor 302 acquires a piece of pixel data from the communication memory 322. Further, if the value of the variable rcv_com_route_mask is 1, the image formation processor 302 acquires a piece of pixel data from the communication memory 323. Further, if the value of the variable rcv_com_route_mask is a value indicating that a piece of pixel data is to be acquired from the register, the image formation processor 302 acquires the pixel data from the register (mask).

Next, the image formation processor 302 performs the predetermined ROP4 processing using the piece of dst pixel data, the piece of src pixel data, the piece of pat pixel data, and the piece of mask pixel data, which are acquired in the steps S1902b, S1903b, S2001a, and S2101 (step S2102). After that, the image formation processor 302 outputs the resulting piece of pixel data formed by the ROP4 processing to the output route selected in the step S1404 (step S1905).

Next, the image formation processor 302 determines whether or not a number of pixels specified by the rendering instruction have been processed (step S1906), and if it is determined that the specified number of pixels have not been processed, the image formation processor 302 returns to the step S1902b, whereas if it is determined that the specified number of pixels have been processed, the image formation processor 302 terminates the present process.

Figure 22:
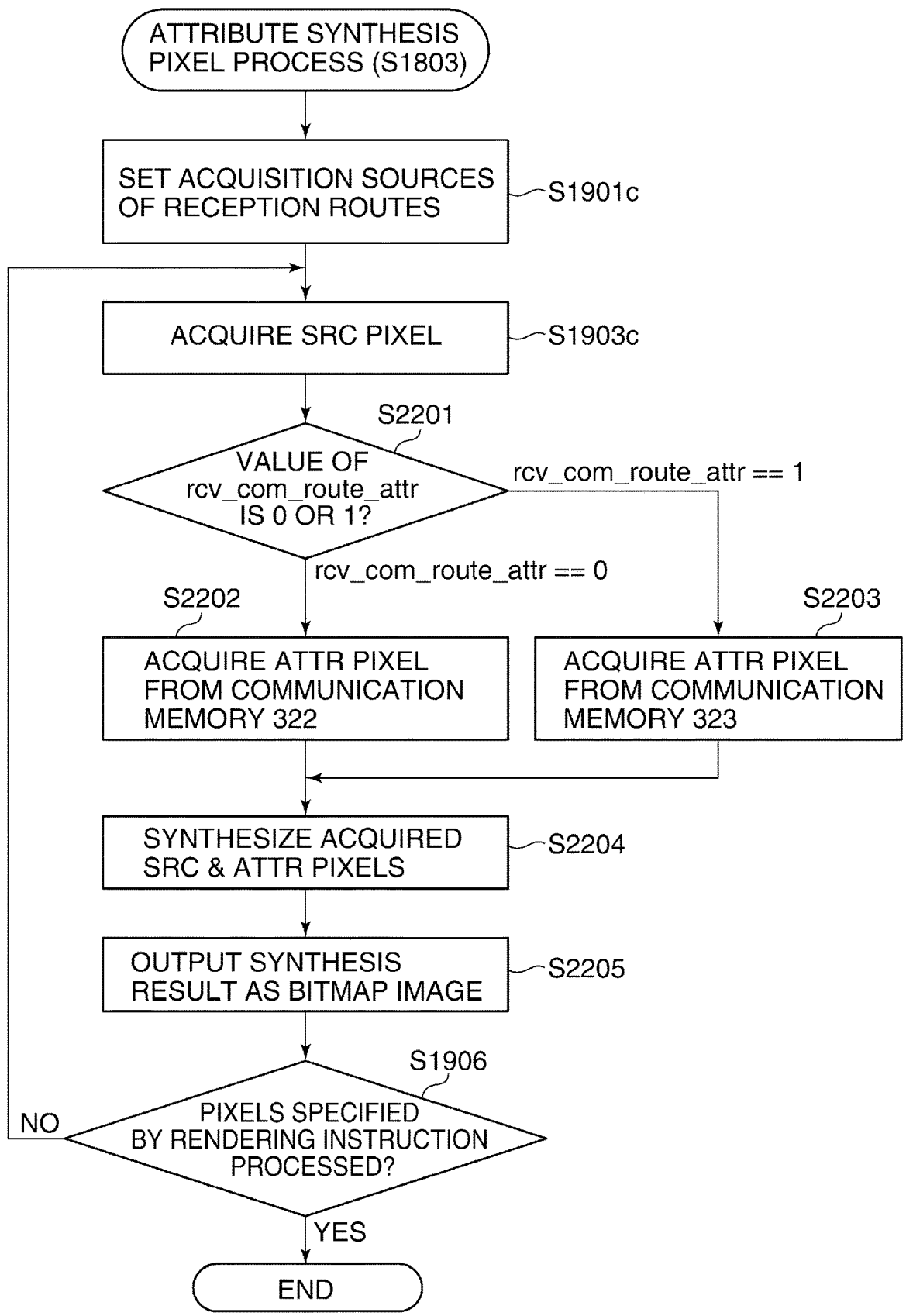
FIG. 22 is a flowchart of an attribute synthesis pixel process performed in a corresponding step in FIG. 18.

FIG. 22 is a flowchart of the attribute synthesis pixel process performed in the step S1803 in FIG. 18. This process is performed by the image formation processor 302.

First, the image formation processor 302 performs a process for setting acquisition sources of pieces of pixel data, which are the reception routes, respectively, based on information from where to acquire the pieces of pixel data necessary for attribute synthesis processing (step S1901c). In this step, the image formation processor 302 performs the same processing as in the step S1901 in FIG. 19 based on the values of the route information route_control set in the step S1801 in FIG. 18 by performing the same processing as in the step S1503.

Then, the image formation processor 302 acquires a piece of src pixel data from the pixel data reception route set in the step S1801 (step S1903c). In the step S1903c, the image formation processor 302 performs the same processing as in the step S1903 in FIG. 19. Further, the image formation processor 302 acquires a piece of attribute pixel data from the pixel data reception route set in the step S1802 (steps S2201, S2202, and S2203).

Next, the image formation processor 302 performs the predetermined attribute synthesis processing using the src pixel data acquired in the step S1903c and the attribute pixel data acquired in the steps S2201, S2202, and S2203 (step S2204). After that, the image formation processor 302 outputs the resulting piece of pixel data formed by the attribute synthesis processing to the communication unit 317 as a bitmap image (step S2205).

Next, the image formation processor 302 determines whether or not a number of pixels specified by the rendering instruction have been processed (step S1906), and if the specified number of pixels have not been processed, the image formation processor 302 returns to the step S1903c, whereas if the specified number of pixels have been processed, the image formation processor 302 terminates the present process.

FIG. 23 is a flowchart of the pixel data saving process (src) performed in the step S1703 in FIG. 17. This process is performed by the image formation processor 302.

First, the image formation processor 302 determines a value set in the variable rcv_com_route_src (step S2301), and if the variable rcv_com_route_src is set to 0, the image formation processor 302 judges that a piece of src image pixel data to be saved is in the communication memory 322. Therefore, in this case, the image formation processor 302 acquires the piece of src image pixel data from the communication memory 322, and stores the acquired piece of src image pixel data in the synthesis pixel data memory 330M (step S2302). After that, the image formation processor 302 determines whether or not a number of pixels specified by the rendering instruction have been processed (step S2303), and if the specified number of pixels have been processed, the image formation processor 302 proceeds to a step S2304, whereas if not, the image formation processor 302 returns to the step S2302. In the step S2304, the image formation processor 302 sets flag information set in the 0-th bit of the route information route_control to 0 so as to indicate that the piece of src image pixel data has been acquired from the communication memory 322, and proceeds to a step S2308.

On the other hand, if it is determined in the step S2301 that the variable rcv_com_route_src is set to 1, the image formation processor 302 judges that a piece of src image pixel data to be saved exists in the communication memory 323. Therefore, in this case, the image formation processor 302 acquires the piece of src image pixel data from the communication memory 323, and stores the acquired piece of src image pixel data in the synthesis pixel data memory 330M (step S2305). After that, the image formation processor 302 determines whether or not a number of pixels specified by the rendering instruction have been processed (step S2306), and if the specified number pixels have been processed, the image formation processor 302 proceeds to a step S2307, whereas if not, the image formation processor 302 returns to the step S2305. In the step S2307, the image formation processor 302 sets the flag information set in the first bit of route_control to 0 so as to indicate that the piece of src image pixel data has been acquired from the communication memory 323, and proceeds to the step S2308.

In the step S2308, the image formation processor 302 sets the variable rcv_com_route_src to mem so as to indicate that the saved piece of src image pixel data is stored in the synthesis pixel data memory 330M, followed by terminating the present process.

Figure 24:
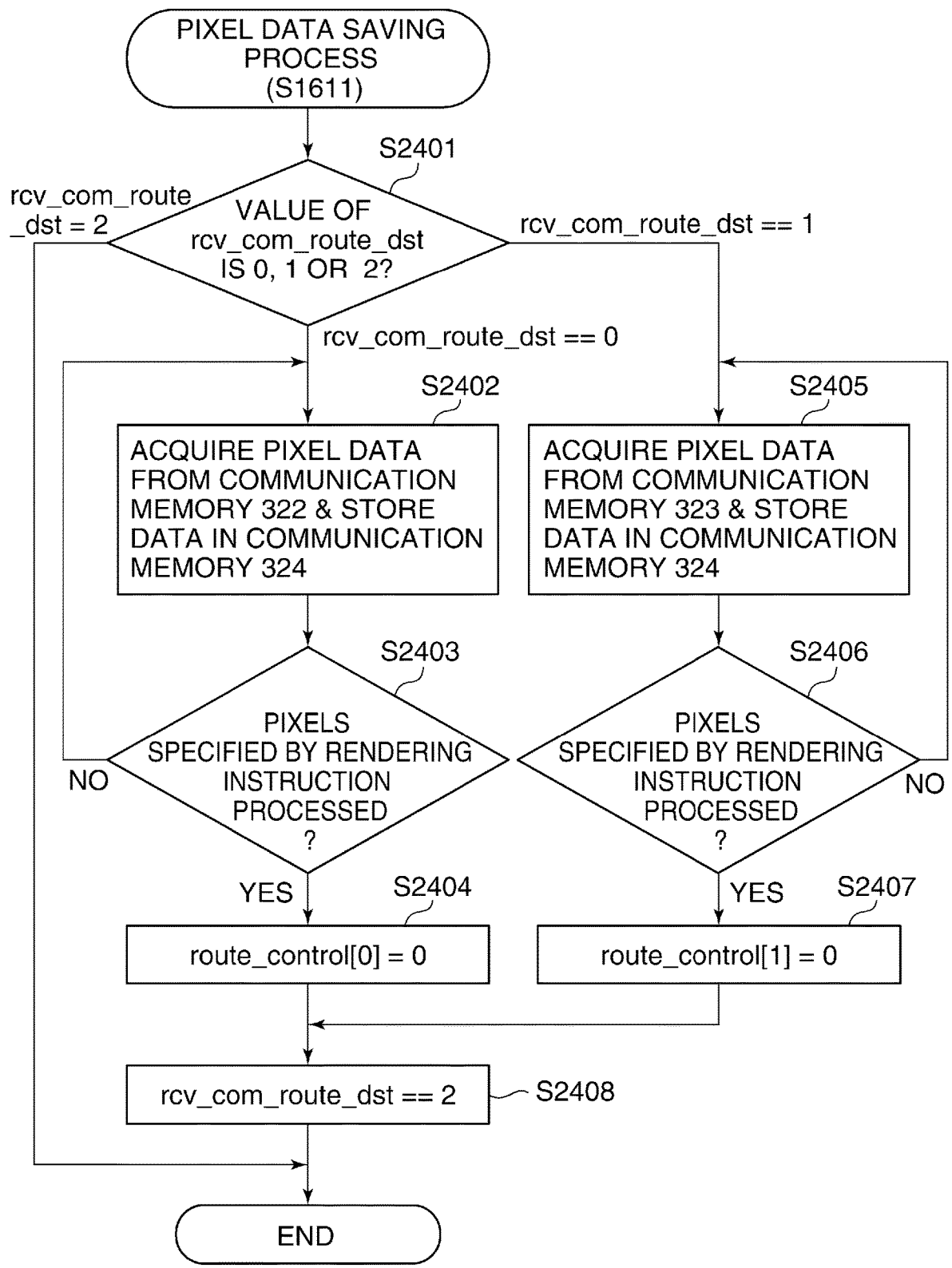
FIG. 24 is a flowchart of a pixel data saving process (dst) performed in a corresponding step in FIG. 16.

FIG. 24 is a flowchart of the pixel data saving process (dst) performed in the step S1611 in FIG. 16. This process is performed by the image formation processor 302.

First, the image formation processor 302 determines a value set in the variable rcv_com_route_dst (step S2401), and if the variable rcv_com_route_dst is set to 2, the image formation processor 302 terminates the present pixel data saving process (dst) (step S1611).

On the other hand, if it is determined in the step S2401 that the variable rcv_com_route_dst is set to 0, the image formation processor 302 judges that a piece of dst image pixel data to be saved exists in the communication memory 322. Therefore, the image formation processor 302 acquires the piece of dst image pixel data from the communication memory 322, and stores the acquired piece of dst image pixel data in the communication memory 324 (step S2402). Next, in a step S2403, the image formation processor 302 determines whether or not a number of pixels specified by the rendering instruction have been processed. If it is determined that the specified number of pixels have been processed, the image formation processor 302 proceeds to a step S2404, whereas if not, the image formation processor 302 returns to the step S2402. In the step S2404, the image formation processor 302 sets flag information set in the 0-th bit of the route information route_control to 0 so as to indicate that the piece of dst image pixel data has been acquired from the communication memory 322, and proceeds to a step S2408.

On the other hand, if it is determined in the step S2401 that the variable rcv_com_route_dst is set to 1, the image formation processor 302 judges that a piece of dst image pixel data to be saved exists in the communication memory 323. Therefore, the image formation processor 302 acquires the piece of dst image pixel data from the communication memory 323, and stores the acquired piece of dst image pixel data in the communication memory 324 (step S2405). Next, the image formation processor 302 determines whether or not a number of pixels specified by the rendering instruction have been processed (step S2406). If the specified number of pixels have been processed, the image formation processor 302 proceeds to a step S2407, whereas if not, the image formation processor 302 returns to the step S2405. In the step S2407, the image formation processor 302 sets flag information set in the first bit of route_control to 0 so as to indicate that the piece of dst image pixel data has been acquired from the communication memory 323, and proceeds to the step S2408.

In the step S2408, the image formation processor 302 sets the variable rcv_com_route_dst to 2 so as to indicate that the saved dst image pixel data is stored in the communication memory 324, followed by terminating the present process.

Figure 25:
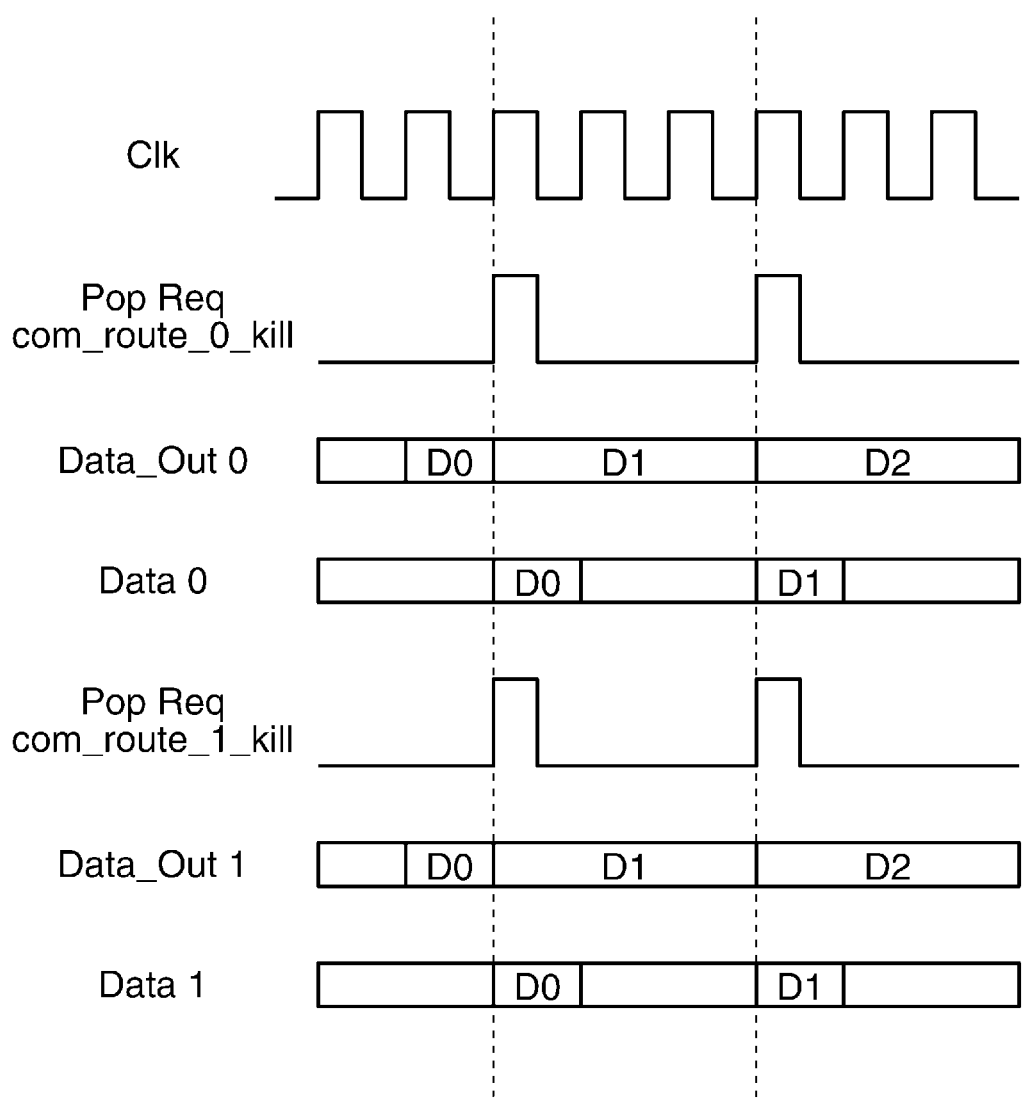
FIG. 25 is a timing diagram of the pixel data synthesis process according to the present embodiment.

FIG. 25 is a timing diagram of the pixel data synthesis processing according to the present embodiment.

As shown in FIG. 25, when the image processing apparatus 110 is powered on, a system clock of the image processing apparatus 110 is supplied from a clock supply section (not shown) of the image processing apparatus 110 to the communication memories 322 to 324, and the pixel data synthesis unit 214.

Each of a piece of dst pixel data, a piece of src pixel data, a piece of pat pixel data, and a piece of mask pixel data, used for the pixel data synthesis process in the step S404 are acquired at the same timing in synchronism with the system clock supplied as above. Further, the synthesis processing is performed by simultaneously using these pieces of pixel data according to a result of acquisition. As shown in FIG. 3B, this mechanism is realized by installing the communication memories (the communication memory control unit and the SRAM) and the communication units, which are independent of each other, to thereby make it possible to independently and simultaneously perform processing. This makes it possible to simultaneously acquire pieces of pixel data necessary for synthesis processing in one cycle, and realize high-speed synthesis processing.

As described above, the image processing apparatus according to the present embodiment makes it possible to perform synthesis processing while arranging pieces of pixel data in communication memories which can be accessed at high speed as much as possible, and thereby realize image formation processing, particularly image pixel synthesis processing at high speed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-161925 filed Aug. 22, 2016, which is hereby incorporated by reference herein in its entirety.

What is claimed is:

1. An image processing apparatus that performs synthesis processing for an area where a first object and a second object overlap each other, comprising:
   a first processing unit configured to generate first pixel data, which corresponds to the area in the first object and generate second pixel data, which corresponds to the area in the second object;
   two different communication paths; and
   a second processing unit configured to receive the first and second pixel data via the two different communication paths from the first processing unit and perform the synthesis processing of the received first and second pixel data;
   wherein the first pixel data is transmitted from the first processing unit to the second processing unit through one of the two different communication paths, and the second pixel data is transmitted from the first processing unit to the second processing unit through the other of the two different communication paths,
   wherein the transmission of the first pixel data is performed in parallel with the transmission of the second pixel data, and
   wherein the second processing unit is configured to start the synthesis processing of the first and second pixel data before completion of receiving the first and second pixel data.

2. The image processing apparatus according to claim 1, wherein a first communication memory exists in the one of the two different communication paths and a second communication memory exists in the other of the two different communication paths.

3. The image processing apparatus according to claim 2, wherein the second processing unit includes:
   a first communication unit configured to transmit an acquisition request of the first pixel data, to the first communication memory, and acquire the first pixel data output from the first communication memory based on the acquisition request of the first pixel data, and
   a second communication unit configured to transmit an acquisition request of the second pixel data, to the second communication memory, and acquire the second pixel data output from the second communication memory based on the acquisition request of the second pixel data.

4. The image processing apparatus according to claim 3, wherein the first and second communication memories each function as a FIFO memory, and
   wherein the first and second communication memories each output a piece of pixel data stored in a head of the FIFO memory, based on the acquisition request received thereby.

5. The image processing apparatus according to claim 2, wherein in order to acquire each of the first and second pixel data, on a pixel-by-pixel basis, the second processing unit issues the acquisition requests to the first and second communication memories, at the same timing, respectively, on a pixel-by-pixel basis, and
   wherein the first and second communication memories output the first and second pixel data to the second processing unit, at the same timing, on a pixel-by-pixel basis, based on the acquisition requests, issued at the same timing and received thereby, on a pixel-by-pixel basis, respectively.

6. The image processing apparatus according to claim 5, further comprising a supply unit configured to supply a common clock to each of the first and second communication memories, and the second processing unit, and
   wherein the second processing unit issues the acquisition requests to the first and second communication memories, respectively, at the same timing, on a pixel-by-pixel basis, according to the supplied clock, and
   wherein the first and second communication memories output the first and second pixel data to the second processing unit, at the same timing, on a pixel-by-pixel basis, according to the supplied clock.

7. The image processing apparatus according to claim 6, wherein the second processing unit acquires the first and second pixel data from the two different communication paths, respectively, at the same timing according to the supplied clock.

8. The image processing apparatus according to claim 2, wherein in a case where the synthesis processing is not performed in the area, the first processing unit stores the second pixel data in one of the first and second communication memories, but does not store the first pixel data in either of the first and second communication memories, and the second processing unit acquires the second pixel data from the one of the first and second communication memories, and outputs the acquired second pixel data without performing the synthesis processing.

9. The image processing apparatus according to claim 2, further comprising a third communication memory configured to temporarily store pixel data transmitted from the second processing unit.

10. An image processing method for an image processing apparatus that includes two different communication paths, and performs synthesis processing for an area where a first object and a second object overlap each other, comprising:
   generating first pixel data, which corresponds to the area in the first object, and generating second pixel data, which corresponds to the area in the second object; and
   receiving the first and second pixel data via the two different communication paths, and performing the synthesis processing of the received first and second pixel data;
   wherein the first pixel data is transmitted through one of the two different communication paths, and the second pixel data is transmitted through the other of the two different communication paths, wherein the transmission of the first pixel data is performed in parallel with the transmission of the second pixel data, and wherein the synthesis processing of the first and second pixel data is started before completion of receiving the first and second pixel data.

11. The image processing method according to claim 10, wherein a first communication memory exists in the one of the two different communication paths and a second communication memory exists in the other of the two different communication paths.

* * * * *